United States Patent
Arnold et al.

(10) Patent No.: US 10,227,889 B2
(45) Date of Patent: Mar. 12, 2019

(54) VARIABLE GEOMETRY NOZZLE FOR PARTITIONED VOLUTE

(71) Applicant: Garrett Transportation I Inc., Torrance, CA (US)

(72) Inventors: Philippe Arnold, Hennecourt (FR); Denis Jeckel, Thaon-les-Vosges (FR); Christophe Riviere, Aydoilles (FR); Dominique Petitjean, Julienrupt (FR); Peter Rhys Davies, Grandvillers (FR); Nathaniel Bontemps, Thaon-les-Vosges (FR)

(73) Assignee: Garrett Transportation I Inc., Torrance, CA (US)

( * ) Notice: Subject to any disclaimer, the term of this patent is extended or adjusted under 35 U.S.C. 154(b) by 469 days.

(21) Appl. No.: 14/992,604

(22) Filed: Jan. 11, 2016

(65) Prior Publication Data

US 2016/0230585 A1    Aug. 11, 2016

Related U.S. Application Data

(60) Provisional application No. 62/112,594, filed on Feb. 5, 2015.

(51) Int. Cl.
*F01D 17/16* (2006.01)
*F01D 5/04* (2006.01)
(Continued)

(52) U.S. Cl.
CPC ........... *F01D 17/165* (2013.01); *F01D 5/043* (2013.01); *F01D 9/026* (2013.01); *F02B 37/025* (2013.01);
(Continued)

(58) Field of Classification Search
CPC ........ F01D 17/165; F01D 5/043; F01D 9/026; F01D 17/16; F01D 17/167; F02B 37/025; F02B 37/24; F02C 6/12; Y02T 10/144
(Continued)

(56) References Cited

U.S. PATENT DOCUMENTS 3,355,878 A * 12/1967 Birmann ............... F01D 17/105
60/281
4,804,316 A * 2/1989 Fleury ................... F01D 17/165
415/134

(Continued)

FOREIGN PATENT DOCUMENTS

DE      4242494 C1      9/1993
EP      2239425 A2 *   10/2010   ........... F01D 17/165
(Continued)

OTHER PUBLICATIONS

EP Application No. 16 153 547.1, European Search Report, dated Jun. 21, 2016 (9 pages).
(Continued)

*Primary Examiner* — Jason D Shanske
*Assistant Examiner* — Brian Christopher Delrue
(74) *Attorney, Agent, or Firm* — Brian J. Pangrle

(57) ABSTRACT

An assembly can include an exhaust gas turbine housing that includes an inner wall and an outer wall that define a first exhaust gas channel and a second exhaust gas channel to a turbine wheel space where the inner wall includes an inner wall end at the turbine wheel space and the outer wall includes an outer wall end at the turbine wheel space; a first adjustable divider vane disposed adjacent to the inner wall end; a second adjustable divider vane disposed adjacent to the outer wall end; and at least one set of adjustable variable (Continued)

geometry nozzle vanes that define nozzle throats that direct flow of exhaust gas from one of the exhaust gas channels to the turbine wheel space.

15 Claims, 19 Drawing Sheets

(51) Int. Cl.
| | | |
|---|---|---|
| *F01D 9/02* | (2006.01) | |
| *F02B 37/02* | (2006.01) | |
| *F02B 37/24* | (2006.01) | |
| *F02C 6/12* | (2006.01) | |

(52) U.S. Cl.
CPC ............... *F02B 37/24* (2013.01); *F02C 6/12* (2013.01); *F05D 2220/40* (2013.01); *Y02T 10/144* (2013.01)

(58) Field of Classification Search
USPC ........................................................ 415/205
See application file for complete search history.

(56) References Cited

U.S. PATENT DOCUMENTS

| | | | | |
|---|---|---|---|---|
| 6,558,117 | B1* | 5/2003 | Fukaya | F01D 17/165 |
| | | | | 415/160 |
| 7,089,664 | B2* | 8/2006 | Ohishi | B21H 7/16 |
| | | | | 29/557 |
| 8,061,976 | B2* | 11/2011 | Hall | B23P 19/084 |
| | | | | 415/160 |
| 9,016,060 | B2* | 4/2015 | Sauerstein | F01D 9/026 |
| | | | | 415/184 |
| 9,017,017 | B2* | 4/2015 | Sausse | F01D 17/165 |
| | | | | 415/160 |
| 9,399,923 | B2* | 7/2016 | Brinkert | F01D 9/026 |
| 9,447,723 | B2* | 9/2016 | Hirth | F02B 37/025 |
| 9,556,882 | B2* | 1/2017 | Heidingsfelder | F01D 17/165 |
| 9,845,770 | B2* | 12/2017 | Martinez-Botas | F01D 5/02 |
| 9,890,700 | B2* | 2/2018 | Sun | F02B 37/24 |
| 9,970,295 | B2* | 5/2018 | Fontaine | F01C 21/10 |
| 2003/0230085 | A1* | 12/2003 | Sumser | F01D 17/165 |
| | | | | 60/602 |
| 2004/0096317 | A1* | 5/2004 | Scholz | F01D 17/165 |
| | | | | 415/160 |
| 2005/0005603 | A1* | 1/2005 | Stilgenbauer | F01D 17/165 |
| | | | | 60/602 |
| 2005/0220616 | A1* | 10/2005 | Vogiatzis | F01D 5/141 |
| | | | | 415/208.1 |
| 2006/0016188 | A1* | 1/2006 | Kennedy | F02B 37/24 |
| | | | | 60/605.2 |
| 2009/0060719 | A1* | 3/2009 | Haugen | F01D 9/026 |
| | | | | 415/145 |
| 2009/0301085 | A1* | 12/2009 | Heyes | F01D 17/14 |
| | | | | 60/611 |
| 2010/0008766 | A1* | 1/2010 | Scholz | F01D 17/165 |
| | | | | 415/160 |
| 2010/0154415 | A1* | 6/2010 | Ehrhard | F01D 17/165 |
| | | | | 60/605.1 |
| 2011/0067397 | A1* | 3/2011 | Hirth | F02B 37/025 |
| | | | | 60/602 |
| 2012/0159946 | A1* | 6/2012 | Sauerstein | F01D 9/026 |
| | | | | 60/598 |
| 2014/0331667 | A1* | 11/2014 | Kindl | F02M 26/43 |
| | | | | 60/602 |
| 2016/0025044 | A1* | 1/2016 | Martinez-Botas | F01D 9/026 |
| | | | | 60/605.2 |
| 2016/0146100 | A1* | 5/2016 | Sun | F02B 37/24 |
| | | | | 415/1 |
| 2018/0087453 | A1* | 3/2018 | Sun | F02B 39/00 |

FOREIGN PATENT DOCUMENTS

| | | | |
|---|---|---|---|
| JP | S62-148738 U1 | | 9/1987 |
| JP | 2007309140 A | * | 11/2007 |
| WO | 2011/031595 A1 | | 3/2011 |
| WO | 2012170754 A1 | | 12/2012 |
| WO | 2014/140598 A1 | | 9/2014 |

OTHER PUBLICATIONS

BorgWarner, The Dual-Volute-VTG from BorgWarner—A New Boosting Concept for DI-SI engines (2009) (27 pages).

\* cited by examiner

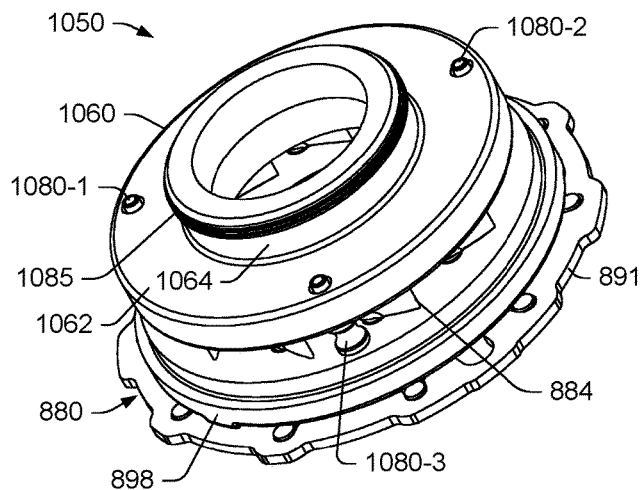
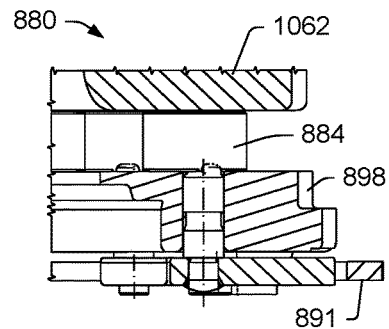
Fig. 10A
Fig. 10B
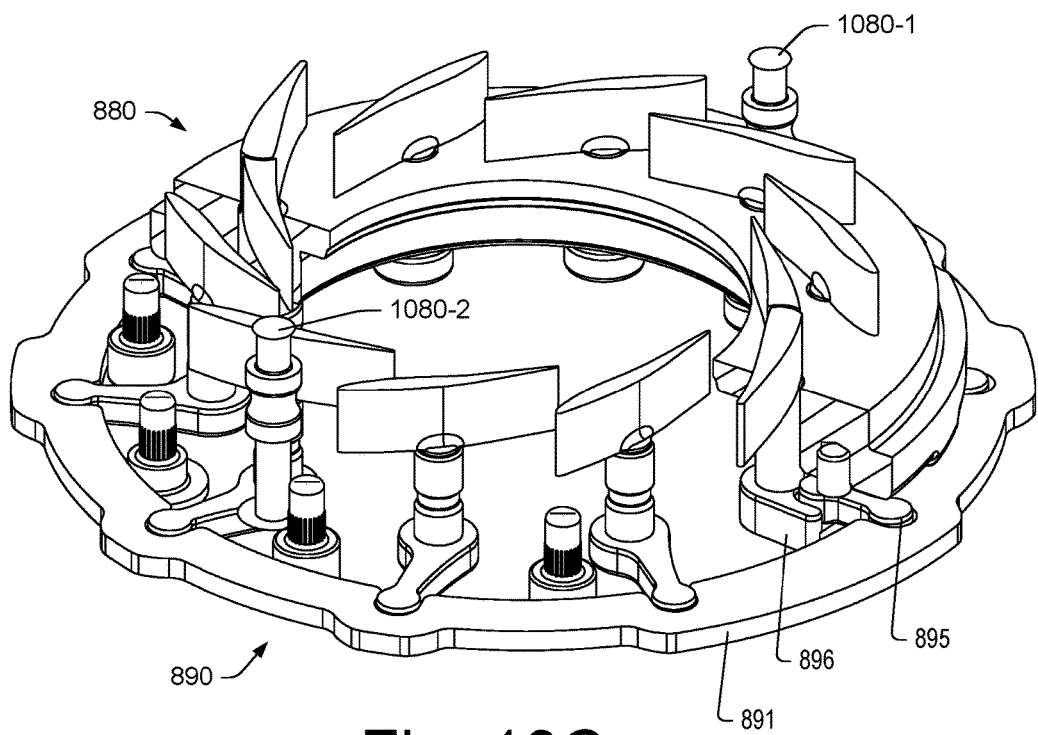
Fig. 10C

State 1100

State 1200

State 1300

State 1500

State 1600

State 1700

VARIABLE GEOMETRY NOZZLE FOR PARTITIONED VOLUTE

RELATED APPLICATIONS

This application claims priority to and the benefit of a US Provisional Application having Ser. No. 62/112,594, filed 5 Feb. 2015, which is incorporated by reference herein.

TECHNICAL FIELD

Subject matter disclosed herein relates generally to turbochargers.

BACKGROUND

A turbocharger can increase output of an internal combustion engine. A turbocharger can include an exhaust turbine assembly that can receive exhaust gas from cylinders of an internal combustion engine. Exhaust may be directed to a turbine wheel such that energy may be extracted, for example, to drive a compressor wheel of a compressor assembly.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where:

FIGS. 10A, 10B and 10C are a perspective view of assemblies, a cross-sectional cutaway view thereof and a perspective view of a portion of an assembly that includes a variable geometry mechanism.

DETAILED DESCRIPTION

Figure 1:
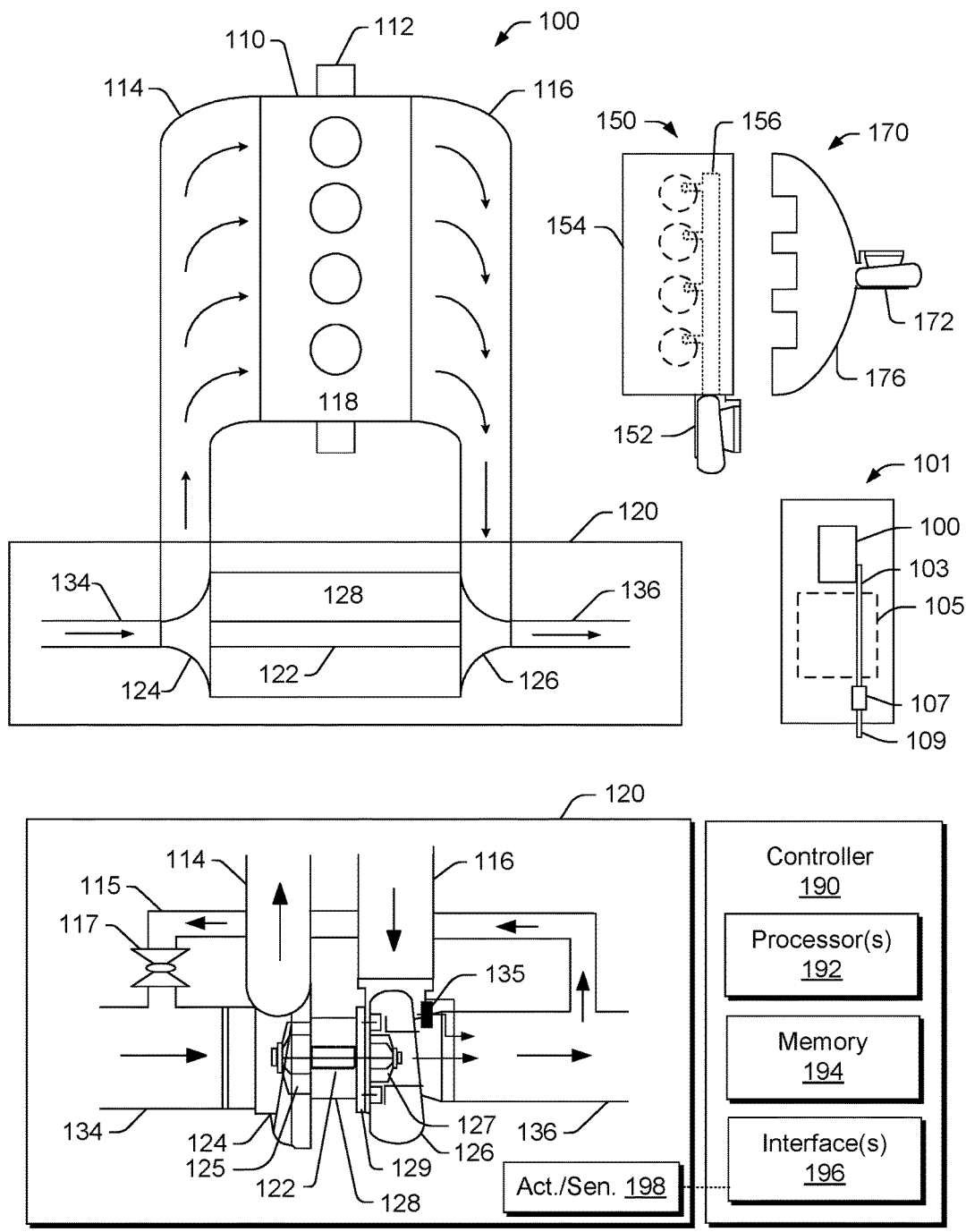
FIG. 1 is a diagram of an example of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

An internal combustion engine such as the engine 110 of FIG. 1 may generate exhaust gas with pulsating flow. In so-called constant-pressure turbocharging (e.g., Stauaufladung), an exhaust gas manifold of sufficiently large volume may act to damp out mass flow and pressure pulses such that flow of exhaust gas to a turbine is relatively steady. Another approach, referred to as pulse turbocharging (e.g., Stoßaufladung), may aim to utilize kinetic energy of exhaust gas as it exits cylinder exhaust ports. For example, relatively short, small-cross section conduits may connect each exhaust port to a turbine so that much of the kinetic energy associated with the exhaust blowdown can be utilized. As an example, suitable groupings of different cylinder exhaust ports may organize exhaust gas pulses such that they are sequential, for example, with minimal overlap. In such a manner, exhaust gas flow unsteadiness may be held to an acceptable level. As an example, decisions as to implementation of constant-pressure or pulse turbocharging may depend on one or more factors such as, for example, power demands, efficiency demands, fuel type, number of cylinders, cylinder/stroke volume, engine size, etc.

Figure 2A:
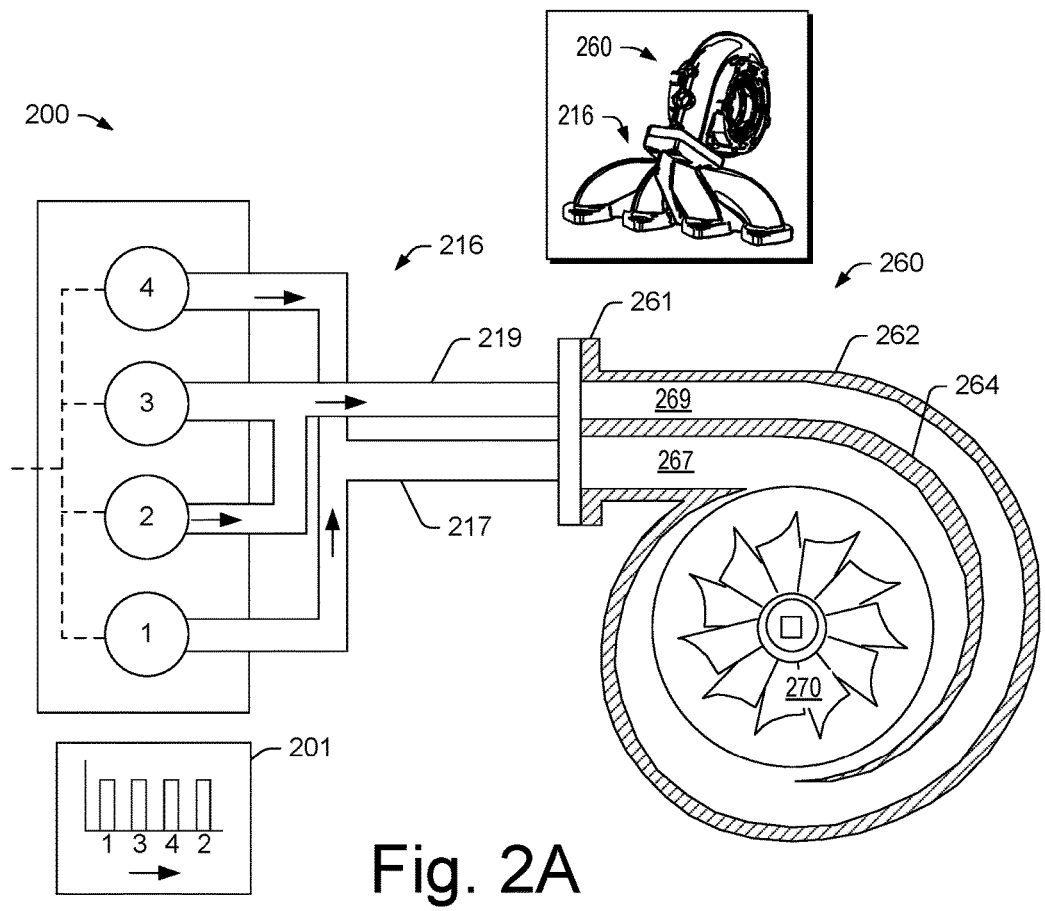
FIGS. 2A, 2B and 2C are views of examples of turbocharger related equipment.

FIG. 2A shows an example of a system 200 that includes a four cylinder internal combustion engine with a firing order 201, for example, consider a firing order 1-3-4-2. As shown, a manifold 216 (e.g., or manifolds) may define exhaust gas flow paths that can direct exhaust gas from the cylinders of the internal combustion engine to a turbine assembly 260, which can, at least in part, house a turbine wheel 270. As shown in FIG. 2A, the turbine assembly 260 includes a flange 261, an outer wall 262 and an inner wall 264 where the outer wall 262 and the inner wall 264 define exhaust volute flow paths 267 and 269. The path 267 may receive exhaust from a flow path 217 in communication with cylinders 1 and 4 and the path 269 may receive exhaust from a flow path 219 in communication with cylinders 2 and 3.

Figure 2B:
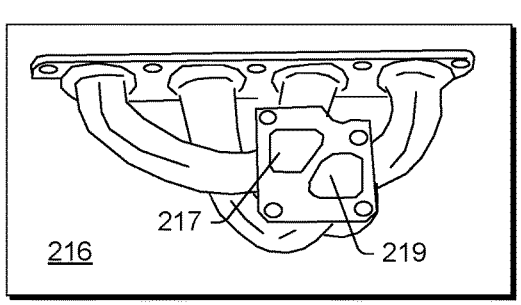

FIG. 2B shows an example of the manifold 216 as including the two flow paths 217 and 219. As an example, the manifold 216 may be considered a divided manifold that separates flow of exhaust from cylinders whose cycles may interfere with one another (e.g., as to exhaust pulse energy). For example, on a four-cylinder engine with firing order 1-3-4-2, cylinder #1 is ending its expansion stroke and opening its exhaust valve while cylinder #2 still has its exhaust valve open (cylinder #2 is in its overlap period). In an undivided exhaust manifold, a pressure pulse from cylinder #1's exhaust blowdown event may be more likely to contaminate cylinder #2 with high pressure exhaust gas, which can impact performance of cylinder #2's (e.g., ability to breathe properly) and diminish pulse energy that may have been better utilized in by a turbine. As an example, a proper grouping for the aforementioned engine may keep complementary cylinders grouped together (e.g., exhaust of cylinders #1 and #4 as one complementary group and cylinders #2 and #3 as another complementary group). Such an approach may better utilize exhaust pulse energy and, for example, improve turbine performance (e.g., increase boost more rapidly).

Figure 2C:
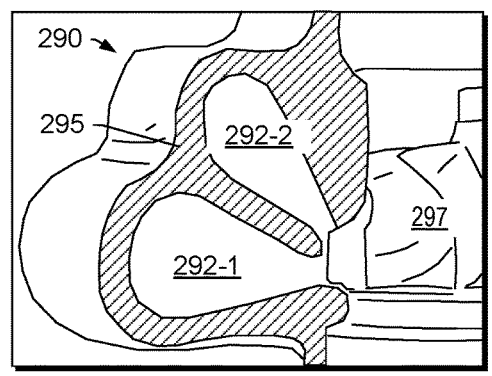

Referring to FIG. 2C, a turbine assembly 290 is shown that includes volutes 292-1 and 292-2 with a divider wall 295 along with a turbine wheel 297. The turbine assembly 290 differs from the turbine assembly 260 in that the volutes 292-1 and 292-2 span a common range of angles about the turbine wheel 297.

In FIG. 2A, the walls 262 and 264 may be walls of a double-channel turbine housing where the paths 267 and 269 are radially adjacently formed channels. As shown, the paths 267 and 269 run in a substantially spiral form with respect to the turbine wheel 270.

As shown, the paths 267 and 269 are of different lengths on account of their geometric arrangement and may accordingly have different gas volumes, for example, with the length of the path 269 being greater than that of the path 267.

While an internal combustion engine with four cylinders is illustrated in FIG. 2A, one or more other engine types and/or numbers of cylinders (for example in-line six cylinder engines, V8 engines, V6 engines, six-cylinder boxer engines) may be employed.

In FIG. 2A, the path 217 may be defined by a first manifold exhaust-gas path length and the path 219 may be defined by a second manifold exhaust-gas path length. In the example of FIG. 2A, the first manifold exhaust-gas path 217 has a length that is longer than that of the second exhaust-gas path 219.

As shown in FIG. 2A, the first manifold path 217 is in communication with the first path 267 while the second manifold path 219 is in communication with the second path 269 such that the longer exhaust-gas path length can be connected to the shorter path of the turbine assembly. Such an approach may aim to "equalize" overall path lengths. As an example, a double-channel (e.g., dual path) turbine housing with considerably different channels may be "equalized" via a manifold geometry with likewise different channels. As an example, a combination of short and long individual paths (e.g., channels) of a turbine housing and manifold may act to obtain approximately equal overall paths.

Figure 3:
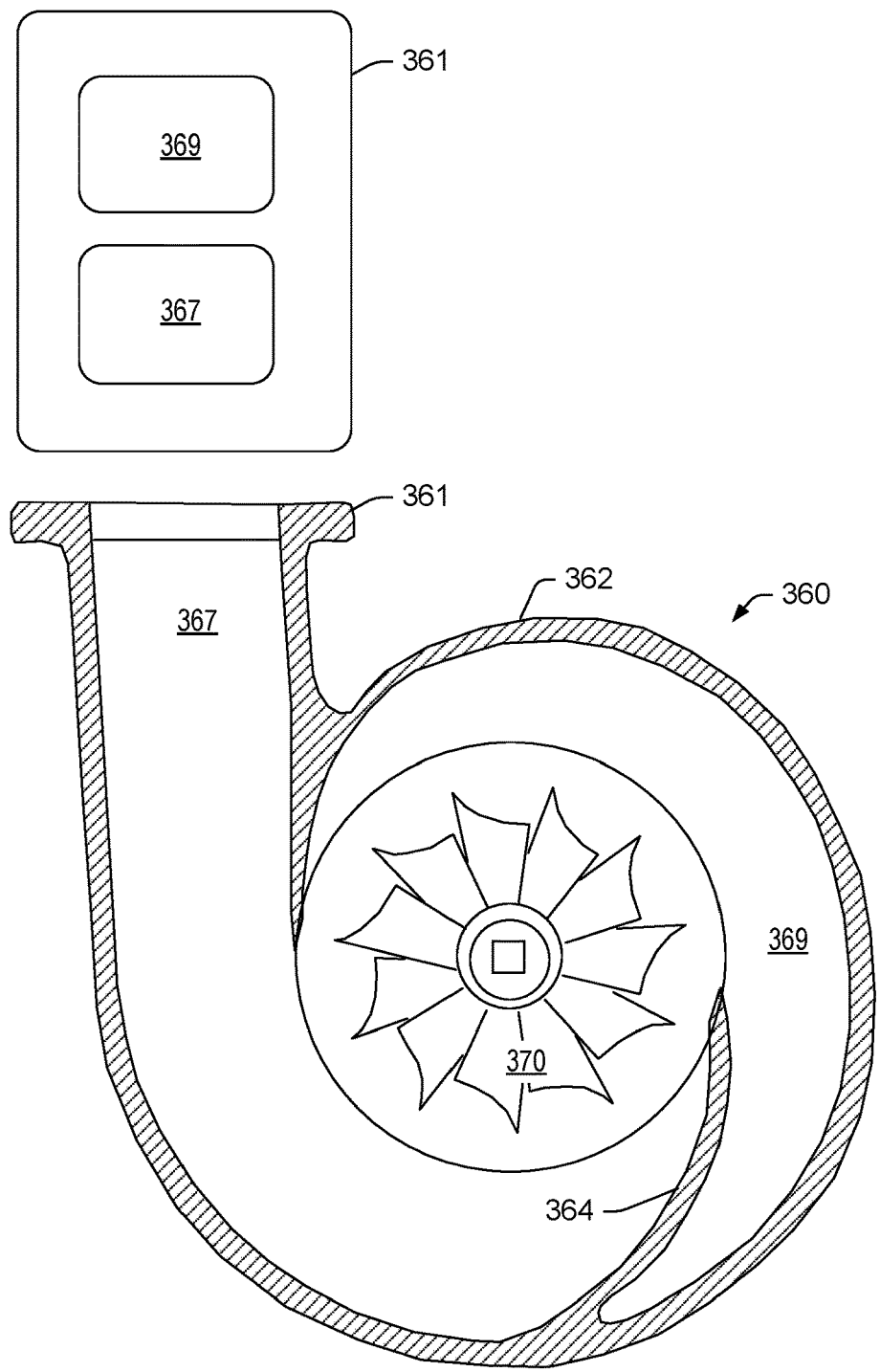
FIG. 3 is a series of views of an example of a portion of an assembly.

FIG. 3 shows an example of a double-channel turbine housing that includes axially adjacent spiral channels 367 and 369, for example, as defined by walls 362 and 364. In FIG. 3, an inlet flange 361 is also shown (see also, e.g., the flange 261 of FIG. 2).

Figure 4:
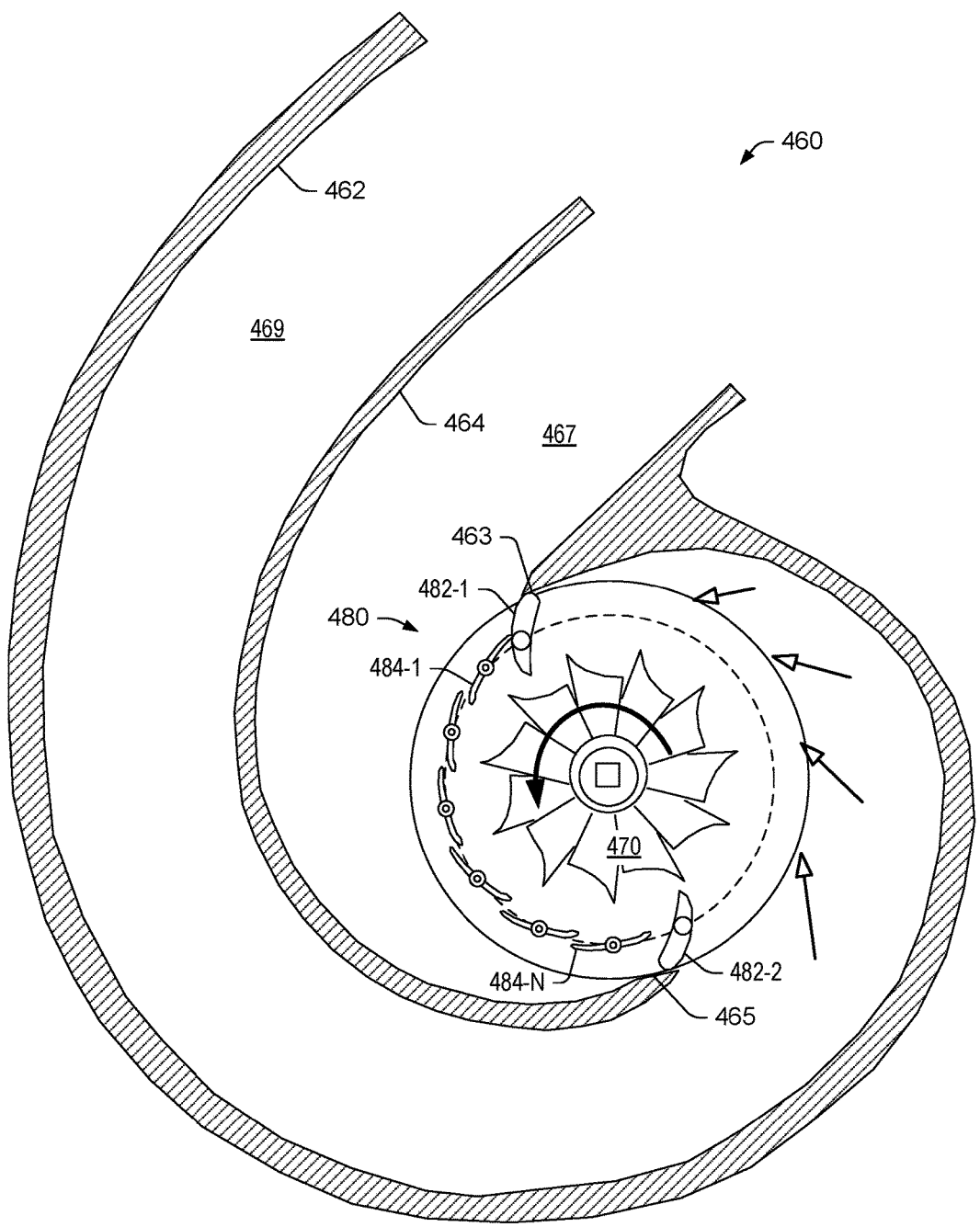
FIG. 4 is a view of an example of a portion of an assembly that includes vanes in a first orientation.

FIG. 4 shows an example of a turbine assembly 460 that includes an outer wall 462 and an inner wall 464 that define paths 467 and 469, a turbine wheel 470 and a variable geometry mechanism 480 that includes one or more vanes 482-1 and 482-2 (e.g., divider vanes) and a series of vanes 484-1 to 484-N (e.g., variable geometry nozzle vanes). As shown, the outer wall 462 includes a wall end 463 and the inner wall 464 includes a wall end 465. In the example of FIG. 4, the vanes 482-1 and 482-2 are in a first orientation (e.g., with respect to the wall ends 463 and 465) that can act to restrict flow of exhaust gas in the path 467 and, for example, to isolate flow of exhaust gas in the path 469 to a range of angles about an axis of the turbine wheel 470. As an example, in the first orientation, the vanes 484-1 to 484-N may be in a "closed" state that acts to restrict flow in the path 467 from interacting with blades of the turbine wheel 470. As an example, where a pressure difference exists in the paths 467 and 469, the first orientation may act to reduce flow interactions of exhaust gas.

As an example, an assembly can include an exhaust gas turbine housing that includes an inner wall and an outer wall that define a first exhaust gas channel and a second exhaust gas channel to a turbine wheel space where the inner wall includes an inner wall end at the turbine wheel space and the outer wall includes an outer wall end at the turbine wheel space; a first adjustable divider vane disposed adjacent to the inner wall end; a second adjustable divider vane disposed adjacent to the outer wall end; and at least one set of adjustable variable geometry nozzle vanes that define nozzle throats that direct flow of exhaust gas from one of the exhaust gas channels to the turbine wheel space.

Figure 5:
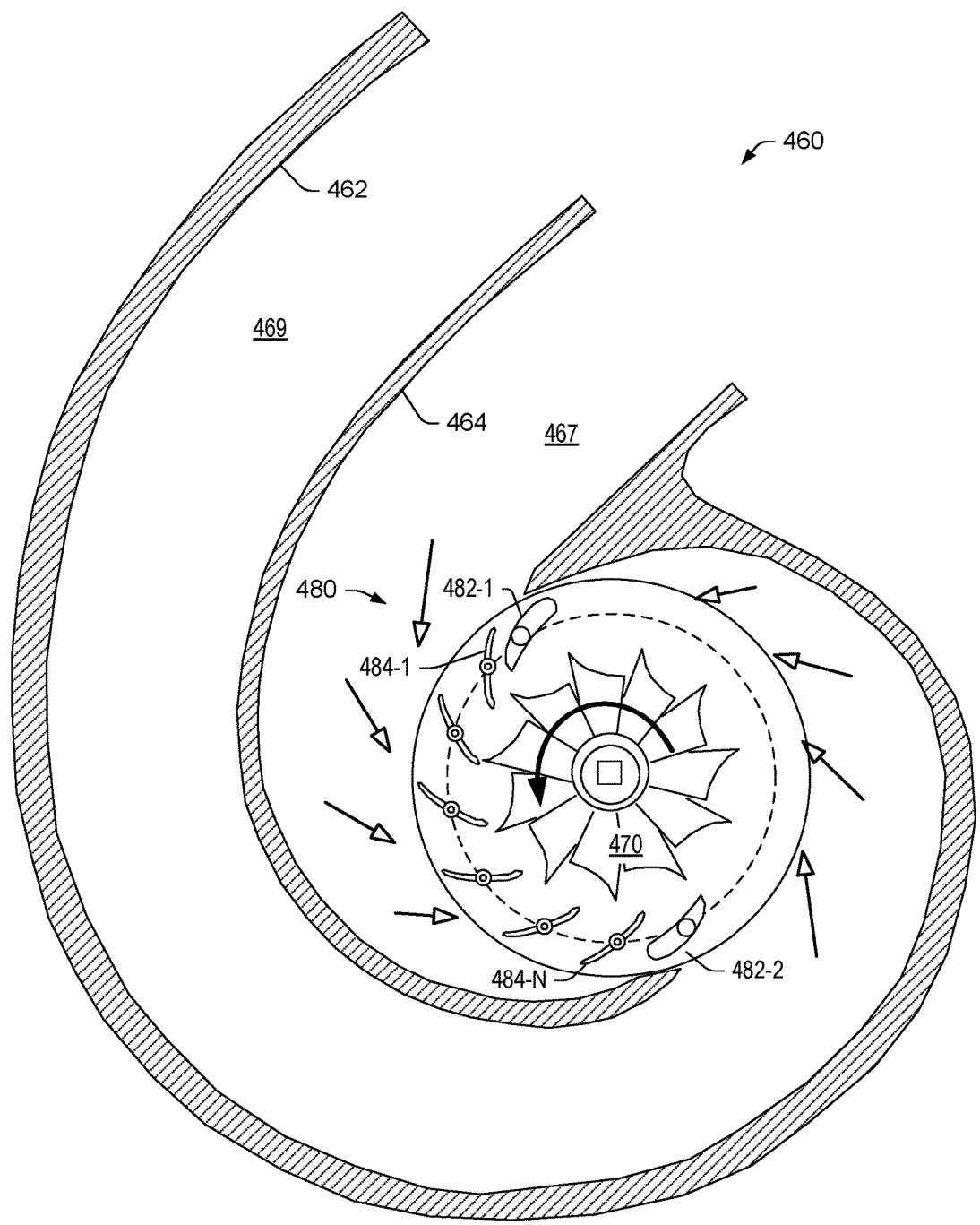
FIG. 5 is a view of an example of the portion of the assembly of FIG. 4 that includes vanes in a second orientation.

FIG. 5 shows the turbine assembly 460 of FIG. 4 wherein the vanes 482-1 and 482-2 and the series of vanes 484-1 to 484-N are in a second orientation. In the second orientation, exhaust gas in the path 467 may flow via throats defined by adjacent vanes toward the turbine wheel 470 (e.g., with a tangential component of flow velocity).

Figure 6A:
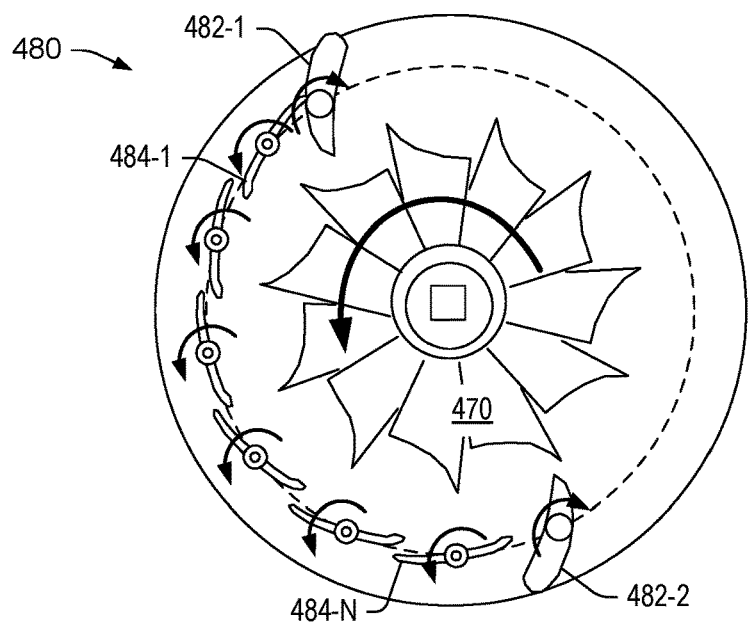
FIGS. 6A and 6B are a series of plan views that illustrate vanes in a first orientation and in a second orientation.
Figure 6B:
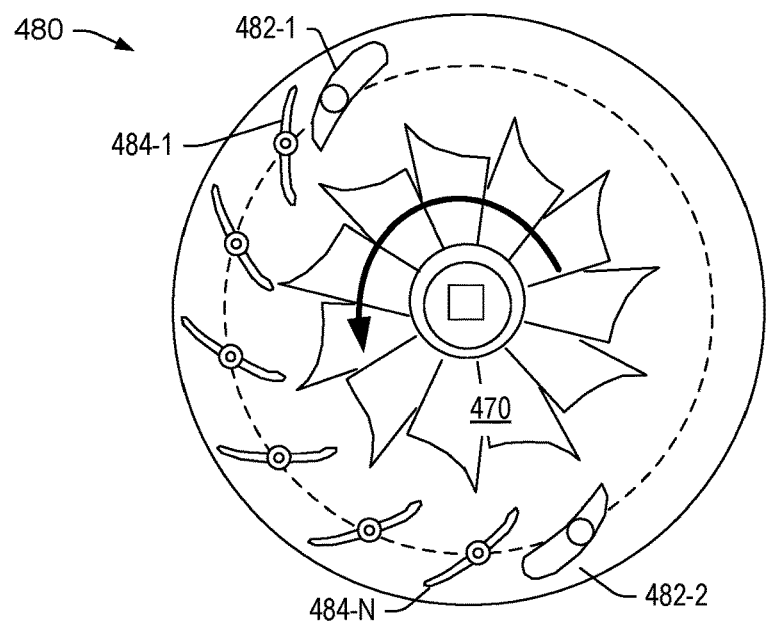

FIGS. 6A and 6B show the first orientation and the second orientation of the vanes 482-1 and 482-2 and the series of vanes 484-1 to 484-N, as well as directions of rotation (e.g., pivoting) of the vanes 482-1 and 482-2 and the series of vanes 484-1 to 484-N in transitioning from the first orientation (FIG. 6A) to the second orientation (FIG. 6B). As shown, the vanes 482-1 and 482-2 may rotate clockwise and counter-clockwise and the vanes 484-1 to 484-N may rotate clockwise and counter-clockwise. As an example, a method may include rotating vanes 482-1 and 482-2 in a direction (e.g., CW or CCW) and rotating vanes 484-1 to 484-N in a different direction (e.g., CCW or CW). As an example, a method may include rotating vanes 482-1 and 482-2 in a direction (e.g., CW or CCW) and rotating vanes 484-1 to 484-N in the same direction (e.g., CW or CCW). As may be appreciated, the directions of rotation may depend on the intended direction of rotation of the turbine wheel 470.

As an example, the vanes 482-1 and 482-2 may be individually, independently pivotable or, for example, the vanes 482-1 and 482-2 may pivot in unison. As an example, the vanes 484-1 to 484-N may be independently pivotable with respect to the vanes 482-1 and 482-2.

For diesel application, a variable nozzle turbine (VNT) can improve turbine energy usage and hence make an engine more fuel efficient. As to gasoline engines, particularly 4 cylinder engines, they tend to be sensitive as to knocking due to backpressure impacting residual gases. Technologies such as twin scroll, enabling flow separation, may be used to improve scavenging and hence low end torque. As an example, pulsating flow may be used to boost turbine power.

Applicability of VNT to gasoline engines may be limited due to its low efficiency characteristic at closed position, impacting knocking sensitivity generated by high back pressure. In addition, closed vane position can act to damp pulse recovery from exhaust gas.

An approach as illustrated in FIGS. 4, 5 and 6 may, for example, act to keep flow separation as far of the turbine wheel via a VNT type of approach that may be used to improve fuel efficiency.

As an example, a variable nozzle may be combined with a twin flow housing. As an example, a mechanism may include one or two vanes that may, for example, move (e.g., pivot) with respect to a wall, which may be a fixed wall. For example, consider a vane or vanes that may be positioned to act as "extensions" of a housing tongue or tongues (e.g., to continue flow separation as far as to a turbine wheel creating a twin flow nozzle). As an example, two vanes may act to define two approximately 180 degree segments of a nozzle circumference area (e.g., between both vanes) where movable vanes may be added to one or both of the segments (e.g., in a VNT approach, etc.). As an example, an end portion of a wall (e.g., a wall end) may be a tongue and a vane may act to alter tongue shape, tongue length, tongue continuity, etc.

As an example, an orientation of vanes may provide for a pulse volute while another orientation of vanes may provide for an open volute. In such an example, twin flow may occur in the open volute, which may help higher engine RPM (e.g., consider Stoß-Stau approaches).

As an example, applied to an axial wheel (e.g., dual-boost variable twin flow) vanes may act to combine ultra-low inertia and variable twin flow.

As an example, the turbine assembly 460 may be employed to address one or more backflow issues. As an example, one or more vanes may be actuated to address backflow of exhaust gas during operation (e.g., depending on power demand, mass flow, volume flow, etc.).

Figure 7:
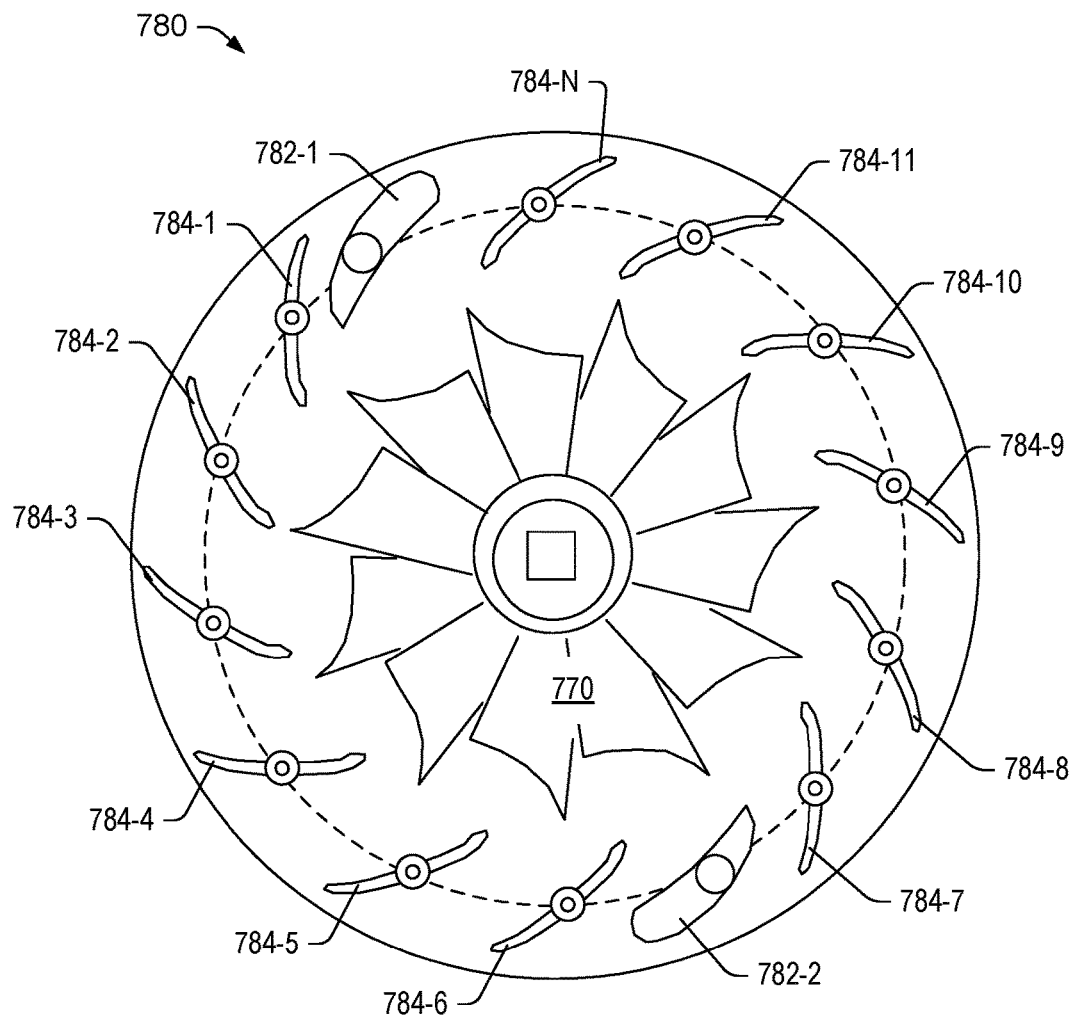
FIG. 7 is a plan view of an example of a variable geometry mechanism.

FIG. 7 shows an example of a variable geometry mechanism 780 that includes various vanes, which may be operable in sets (e.g., optionally independently). As shown, one set can be vanes labeled 784-1, 784-2, 784-3, 784-5, and 785-6 and another set can be vanes labeled 784-7, 784-8, 784-9, 784-10, 784-11 and 784-N, noting that the number of vanes (e.g., N) can differ from the number of vanes shown in the example of FIG. 7. As shown, the variable geometry mechanism 780 includes vanes 782-1 and 782-2 as divider vanes.

Figure 8:
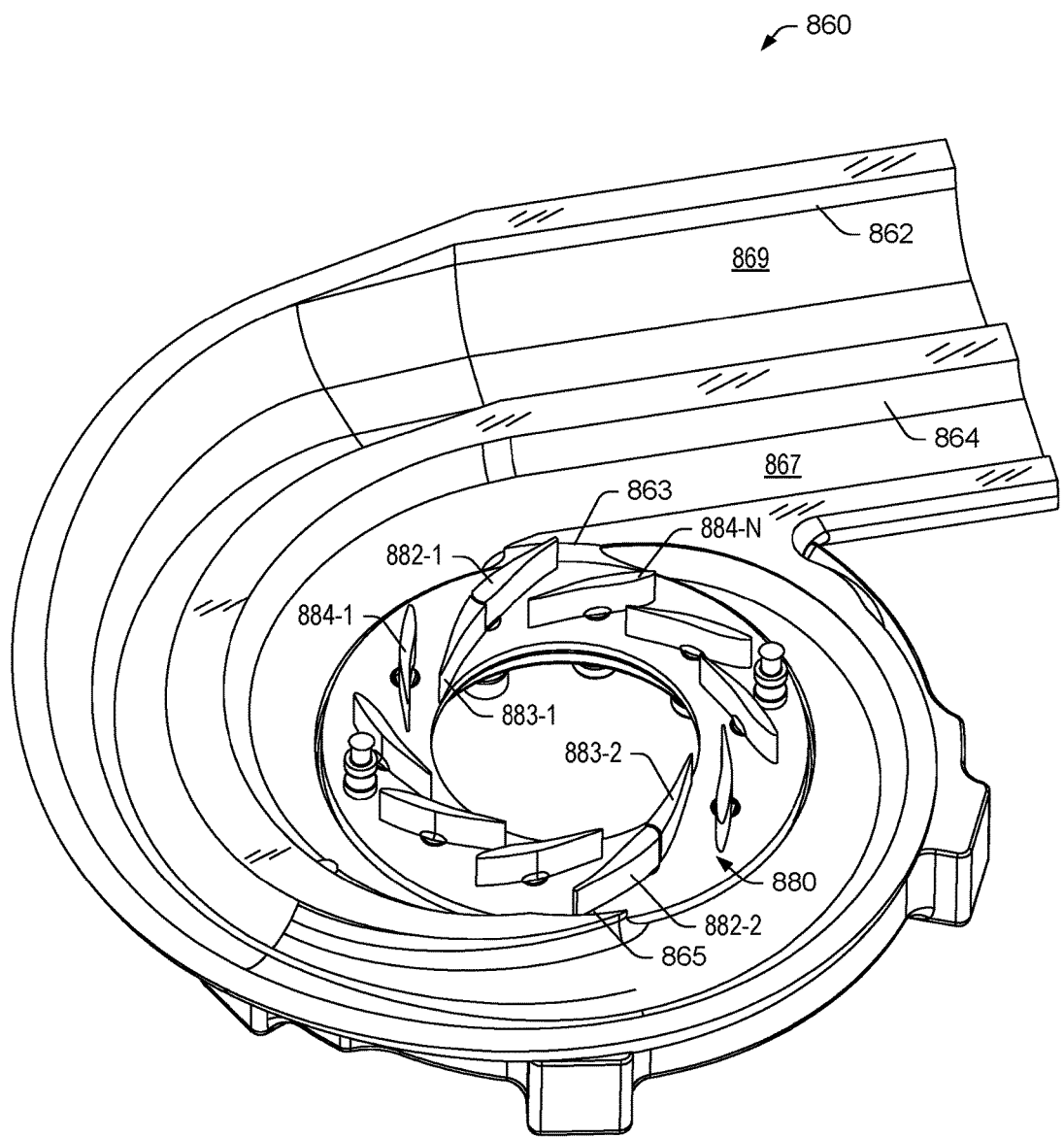
FIG. 8 is a perspective view of an example of a portion of an assembly that includes a variable geometry mechanism.

FIG. 8 shows an example of a portion of an assembly 860 that includes a variable geometry mechanism 880. As shown, the assembly 860 includes a body with a wall 862 and a wall 864 that define paths 867 and 869. The wall 862 includes a wall end 863 at a turbine wheel space and the wall 864 includes a wall end 865 at the turbine wheel space. The variable geometry mechanism 880 includes vanes 882-1 and 882-2 and vanes 884-1 to 884-N. Also shown are structures 883-1 and 883-2. The structures 883-1 and 883-2 may be fixed or optionally movable. As shown, the vanes 882-1 and 882-2 may form relatively continuous surfaces with the structures 883-1 and 883-2. Pivoting of the vanes 883-1 and 883-2 may alter these surfaces to direct exhaust gas, for example, with respect to paths 867 and 869.

As shown in the example of FIG. 8, the vane 882-1 may be pivotable with respect to the wall end 863, which is fixed, and the vane 882-2 may be pivotable with respect to the wall end 865, which is fixed. In such an example, flow at the wall ends 863 and 865 may be altered via pivoting of the vanes 882-1 and 882-2. Such pivoting may alter flow in the paths (or channels) 867 and 869 to the turbine wheel space. An operational mode may coordinate pivoting of vanes 882-1 and 882-2 with pivoting of the vanes 884-1 to 884-N. As an example, the vanes 884-1 to 884-N may include two sets, one corresponding to each of the paths 867 and 869. As an example, such sets may be independently adjustable or, for example, adjustable in unison. As an example, the vanes 882-1 and 882-2 and the vanes 884-1 to 884-N may be adjustable in unison. As an example, the vanes 882-1 and 882-2 may be independently adjustable from the vanes 884-1 to 884-N.

As an example, an assembly can include an exhaust gas turbine housing that includes an inner wall and an outer wall that define a first exhaust gas channel and a second exhaust gas channel to a turbine wheel space where the inner wall includes an inner wall end at the turbine wheel space and the outer wall includes an outer wall end at the turbine wheel space; a first adjustable divider vane disposed adjacent to the inner wall end; a second adjustable divider vane disposed adjacent to the outer wall end; and at least one set of adjustable variable geometry nozzle vanes that define nozzle throats that direct flow of exhaust gas from one of the exhaust gas channels to the turbine wheel space.

Figure 9:
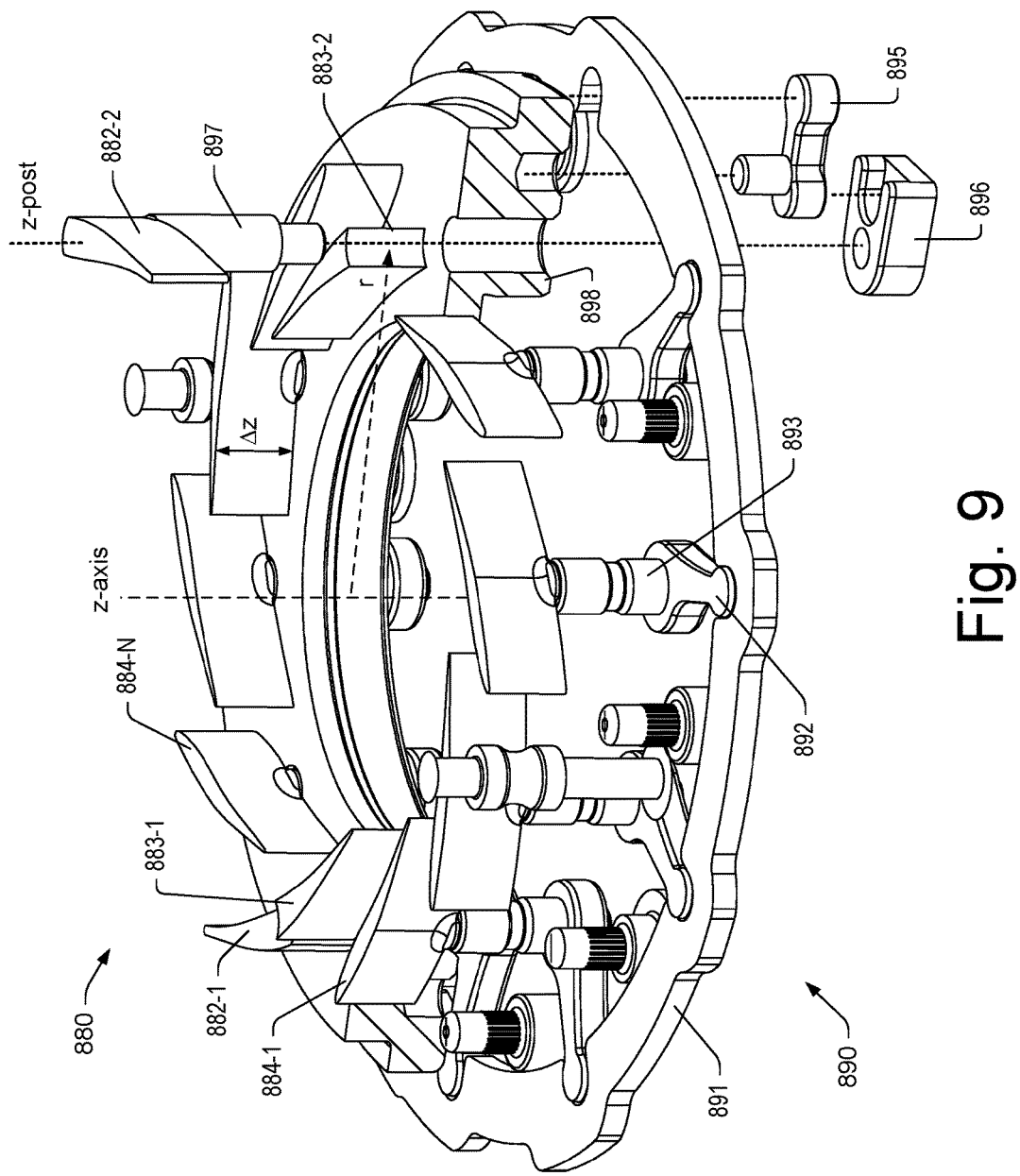
FIG. 9 is a perspective view of a portion of an example of an assembly that includes a variable geometry mechanism.

FIG. 9 shows a portion of the assembly 860 of FIG. 8, particularly, a cutaway and partially exploded view. In the example of FIG. 9, various components, features, etc., may be described, for example, with respect to a z-axis that can coincide with a rotational axis of a turbine wheel. As shown, the z-axis may be a reference to define various radial and/or axial dimensions. For example, vanes can include a vane height Δz and one or more vane posts can be disposed at a radial distance r from the z-axis, which may be referred to as a central axis. As an example, various components can be concentric (e.g., substantially aligned with respect to the z-axis). As an example, during operation, one component may be fixed with respect to the z-axis while another component rotates about the z-axis. As an example, vanes may rotate about individual post axes such as, for example, individual z-post axes. As shown in the example of FIG. 9, the z-post axis labeled may be disposed a radial distance r from the z-axis.

As shown in FIG. 9, the variable geometry mechanism 880 includes a subassembly 890 that includes a ring 891, which may be a rotatable ring (e.g., a rotatable unison ring) where the ring 891 may be rotatable about the z-axis. In the example of FIG. 9, the ring 891 includes sockets that can receive respective lobe ends of control links 892 that are operatively coupled to respective vane posts 893. As shown in the example of FIG. 9, a socket of the ring 891 may accept a lobe end of a first control link 895, which, in turn, operatively couples to a second control link 896 that operatively couples to a post 897 of the vane 882-2. The vane 882-1 may be operatively coupled to such components as well (e.g., another set of the first control link 895 and the second control link 896, etc.). The ring 891 may be supported at least in part by rollers (e.g., along an inner circumference and/or an outer circumference).

Also shown in FIG. 9 is a nozzle ring 898, which is presented in a cutaway view with cross-sectioned surfaces across post bores for posts of the vanes 882-1 and 882-2 (see, e.g., the post 897). As an example, the nozzle ring 898 may be substantially centered about the z-axis and may be disposed in an assembly such that the nozzle ring 898 is substantially fixed such that it does not rotate about the z-axis. As an example, the nozzle ring 898 may be operatively coupled to one or more biasing mechanisms (e.g., resilient plate or plates, spring or springs, etc.) such that some movement of the nozzle ring 898 may occur along the z-axis. In the example of FIG. 9, the nozzle ring 898 includes an upper surface and a lower surface where the post bores for the vanes 882-1, 882-2, and 884-1 to 884-N extend from the lower surface to the upper surface. Posts disposed in the post bores can be rotated via the rotation of the ring 891 (e.g., rotated about respective post axes) to thereby pivot vanes to which the posts are attached. A vane fronting surface or surfaces may be disposed to one side of the vanes, for example, a hub side of each of the vanes, opposite a base side of each of the vanes, may face a vane fronting surface or surfaces, where the base sides face the upper surface of the nozzle ring 898. In such an example, nozzles may be defined between the upper surface of the nozzle ring 898 and the vane fronting surface or surfaces and between adjacent vanes. As an example, a space between two adjacent vanes may be referred to a throat where, for example, the shape of the throat may be adjustable via pivoting of one or both of the two adjacent vanes. Shapes of throats may direct exhaust gas, for example, in a more tangential or a more axial manner with respect to an axis of rotation of a turbine wheel disposed in a turbine wheel space that may be defined in part via the nozzle ring 898.

In the example of FIG. 9, the nozzle ring 898 includes a partial bore that can receive a peg that extends axially from the first control link 895. As shown, the first control link 895 (e.g., control arm) includes lobe ends, one that is received by a socket of the ring 891 and one that is received by a socket of the second control link 896. In such an example, rotation of the ring 891 causes the first control link 895 to pivot about the peg (e.g., a peg axis), which, in turn, causes the second control link 896 to pivot. As shown, the second control link 896 includes an aperture that receives an end of the post 897. In such an example, the post 897 may be fixed with respect to the second control link 896 such that when the second control link 896 pivots, the vane 882-2 pivots.

While a ring with sockets and control links with lobes is shown in FIG. 9, vanes may be controllable via one or more other types of mechanisms. For example, a mechanism or mechanisms may include multiple rings, a ring mechanism and another type of mechanism, etc. As an example, the vanes 884-1 to 884-N may be adjustable independently of the vanes 882-1 and 882-2 or the vanes may be adjustable in a coordinate manner (e.g., via rotation of a ring mechanism, etc.).

As an example, a mechanism may be actuatable (e.g., adjustable, etc.) via a mechanical actuator, an electronic actuator, a pneumatic actuator, a hydraulic actuator, etc. As an example, an actuator may be a hybrid actuator (e.g., a combination of two or more of the aforementioned types of actuators). As an example, an actuator may be operatively coupled to an engine control unit (ECU). As an example, a processor may execute instructions stored in memory such that an actuator is instructed to actuate a mechanism or mechanisms that can adjust a vane, a pair of vanes, a set of vanes, sets of vanes, etc. As an example, an actuator may actuate a ring where lobe ends of control links move with the ring to thereby rotate, directly and/or indirectly, vanes (e.g., via vane posts, etc.).

FIG. 10A shows a portion of the assembly 860 as including another assembly 1050, FIG. 10B shows a cross-sectional view that includes a portion of the assembly 860 and a portion of the assembly 1050 and FIG. 10C shows a portion of the assembly 860 where the first and second control links 895 and 896 are installed and controllable via rotation of the ring 891.

In FIG. 10A, the assembly 1050 includes an insert 1060 that is operatively coupled to the variable geometry mechanism 880 via a plurality of spacers 1080-1, 1080-2 and 1080-3, noting that fewer or more spacers may be included. For example, in FIG. 10C, two spacers are illustrated 1080-1 and 1080-2. In the example of FIG. 10A, the insert 1060 includes a substantially planar base portion 1062 and a cylindrical portion 1064 that rises axially from the substantially planar base portion 1062. As shown, the cylindrical portion 1064 can include one or more seal elements 1085. As an example, a different type of seal element or seal elements may be included. In the cross-sectional cutaway view of FIG. 10B, a vane 884 is shows as being disposed between a lower surface of the substantially planar base portion 1062 of the insert 1060 and an upper surface of the nozzle ring 898. As an example, the spacers (e.g., 1080-1 and 1080-2 or 1080-1, 1080-2, 1080-3, etc.) may space the insert 1060 an axial distance from the nozzle ring 898 to define a nozzle axial height of a nozzle space where pivotable vanes disposed in the nozzle space can include vane heights that provide clearance for pivoting in the nozzle space. As an example, the insert 1060 can include a shroud surface that is contoured in a manner that defines a clearance with respect to blades of a turbine wheel. The cylindrical portion 1064 of the insert 1060 may be defined by an inner radius that defines a flow path for exhaust such that exhaust entering the nozzle space can flow about a turbine wheel and then exit.

Figure 11B:
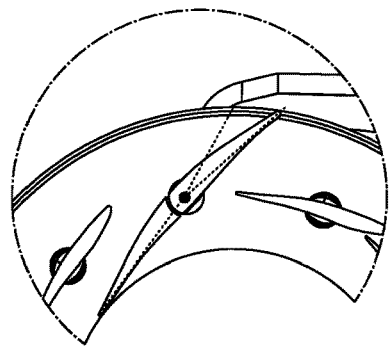
FIGS. 11A, 11B, 11C and 11D are views of portions of an example of an assembly that includes vanes in a first orientation or state.
Figure 11A:
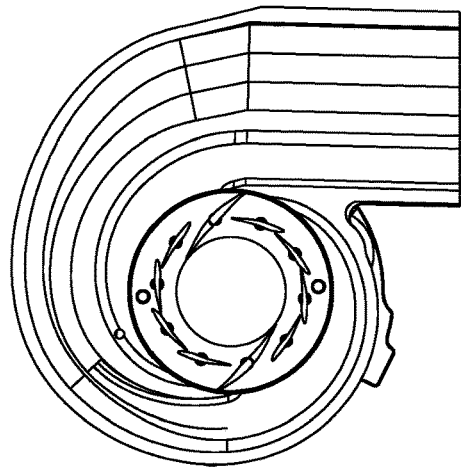
Figure 11C:
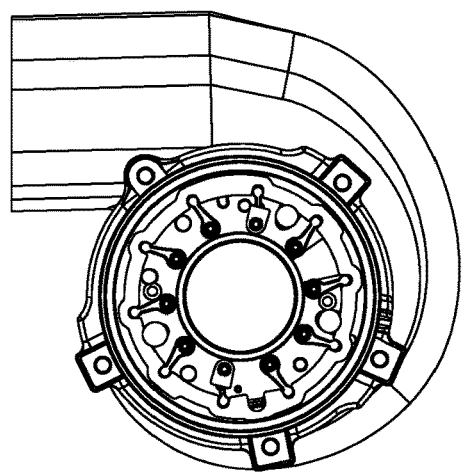
Figure 11D:
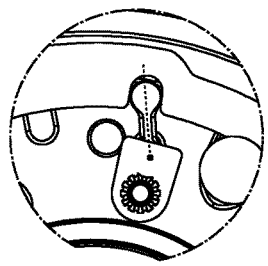

FIGS. 11A, 11B, 11C and 11D show portions of the assembly 860 where vanes are in a first orientation or state 1100. As shown in FIG. 11D, orientation of control links determines orientation of a vane, as shown in FIG. 11B.

Figure 12B:
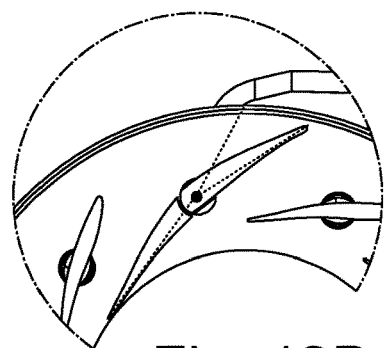
FIGS. 12A, 12B, 12C and 12D are views of portions of an example of an assembly that includes vanes in a second orientation or state.
Figure 12A:
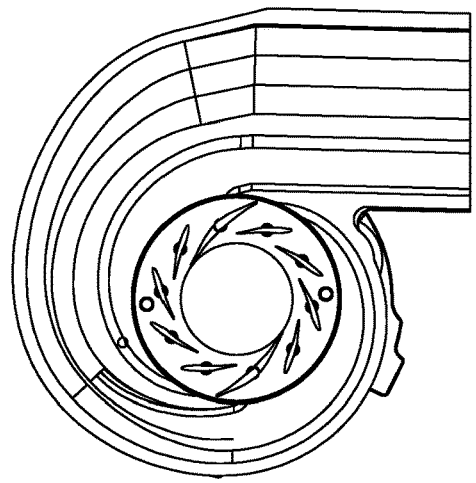
Figure 12C:
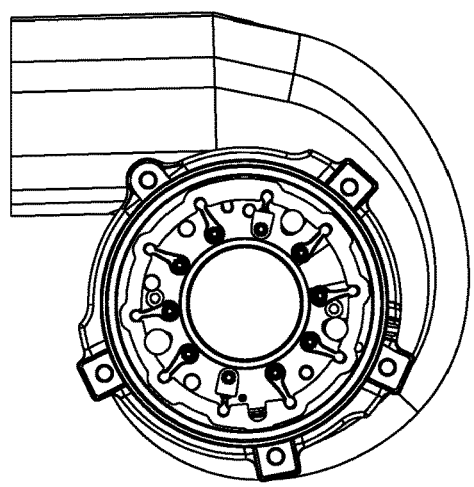
Figure 12D:
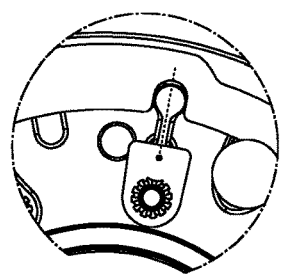
Figure 13B:
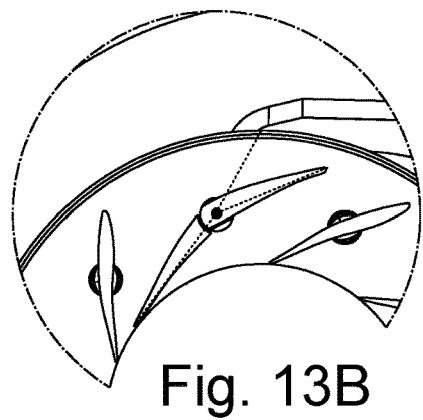
FIGS. 13A, 13B, 13C and 13D are views of portions of an example of an assembly that includes vanes in a third orientation or state.
Figure 13A:
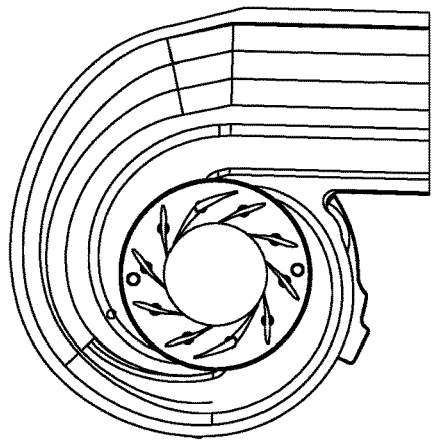
Figure 13D:
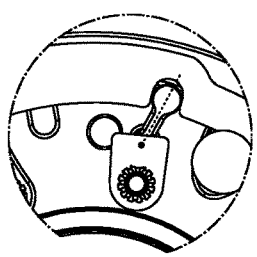
Figure 13C:
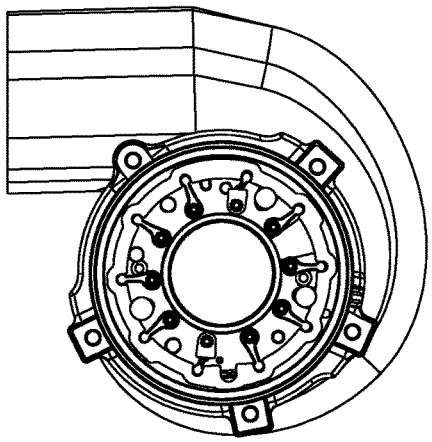

FIGS. 12A, 12B, 12C and 12D show portions of the assembly 860 where vanes are in a second orientation or state 1200. As shown in FIG. 12D, orientation of control links determines orientation of a vane, as shown in FIG. 12B. As shown in FIGS. 11B, 12B and 13B, a divider vane can move between various positions and, as shown in FIGS. 11D, 12D and 13D, a control link can move between various positions. FIG. 12B and FIG. 12D show positions intermediate to those of FIG. 11B and FIG. 13B and FIG. 11D and FIG. 13D, respectively.

FIGS. 13A, 13B, 13C and 13D show portions of the assembly 860 where vanes are in a third orientation or state 1300. As shown in FIG. 13D, orientation of control links determines orientation of a vane, as shown in FIG. 13B.

Figure 14A:
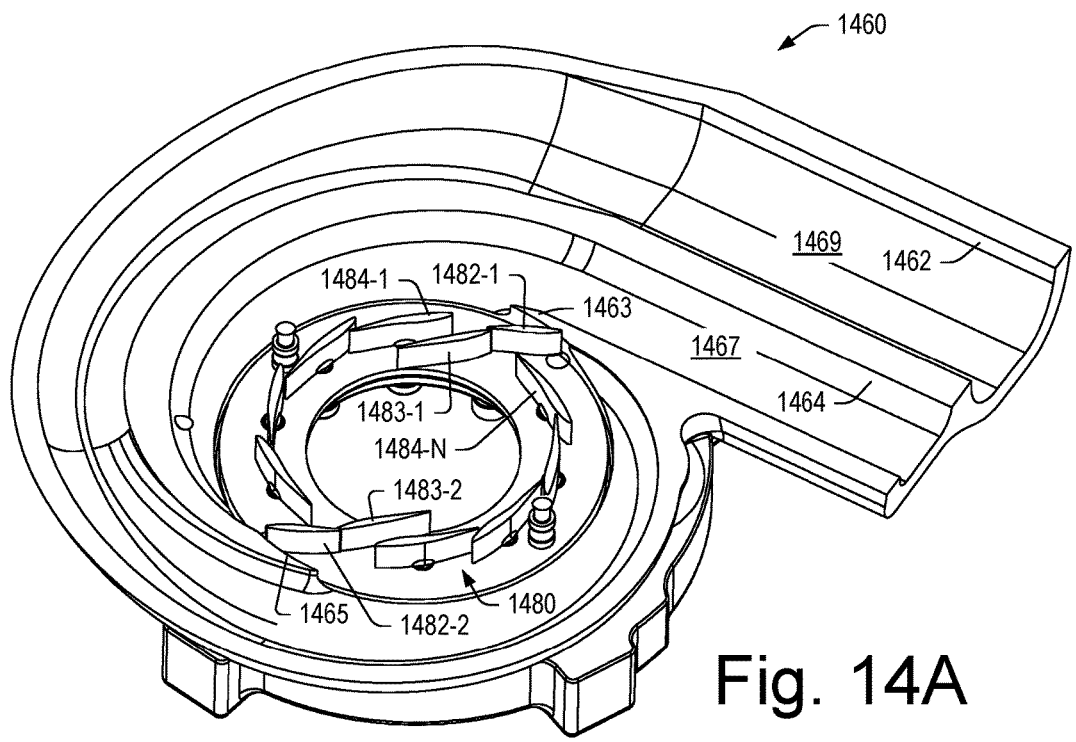
FIGS. 14A and 14B are views of portions of an example of an assembly that includes a variable geometry mechanism.
Figure 14B:
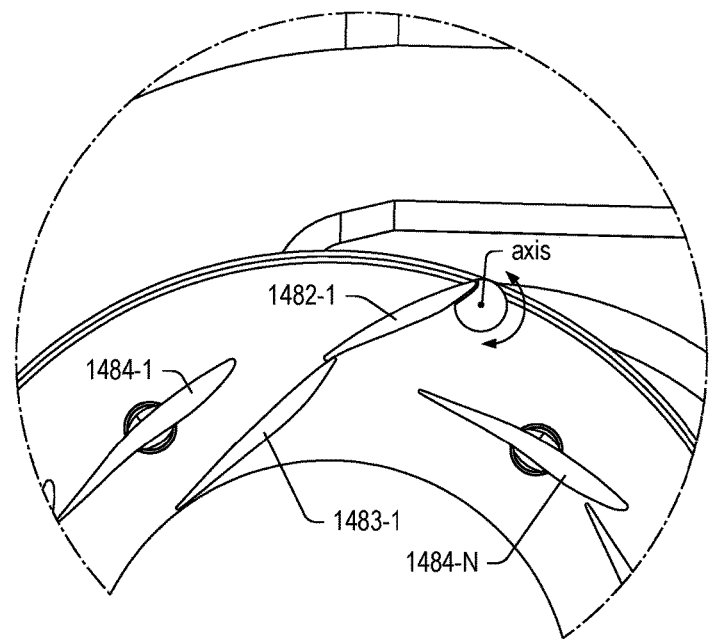

FIGS. 14A and 14B show an example of a portion of an assembly 1460 that includes a variable geometry mechanism 1480. As shown, the assembly 1460 includes a body with a wall 1462 and a wall 1464 that define paths 1467 and 1469 where the wall 1462 includes a wall end 1463 (e.g., a wall end surface) and the wall 1464 includes a wall end 1465 (e.g., a wall end surface). The variable geometry mechanism 1480 includes vanes 1482-1 and 1482-2 and vanes 1484-1 to 1484-N. Also shown are structures 1483-1 and 1483-2. The structures 1483-1 and 1483-2 may be fixed or optionally movable. As shown, the vanes 1482-1 and 1482-2 may form relatively continuous surfaces with the structures 1483-1 and 1483-2. Pivoting of the vanes 1483-1 and 1483-2 may alter these surfaces to direct exhaust gas, for example, with respect to paths 1467 and 1469. As shown in the view of FIG. 14B, the vane 1482-1 can pivot about an axis, which may be disposed at a radial distance from a central axis (e.g., a z-axis as in FIG. 9) that is greater than a radial distance of the vanes 1484-1 to 1484-N.

As an example, an assembly can include an exhaust gas turbine housing that includes an inner wall and an outer wall that define a first exhaust gas channel and a second exhaust gas channel to a turbine wheel space where the inner wall includes an inner wall end at the turbine wheel space and the outer wall includes an outer wall end at the turbine wheel space; a first adjustable divider vane disposed adjacent to the inner wall end; a second adjustable divider vane disposed adjacent to the outer wall end; and at least one set of adjustable variable geometry nozzle vanes that define nozzle throats that direct flow of exhaust gas from one of the exhaust gas channels to the turbine wheel space.

Figure 15A:
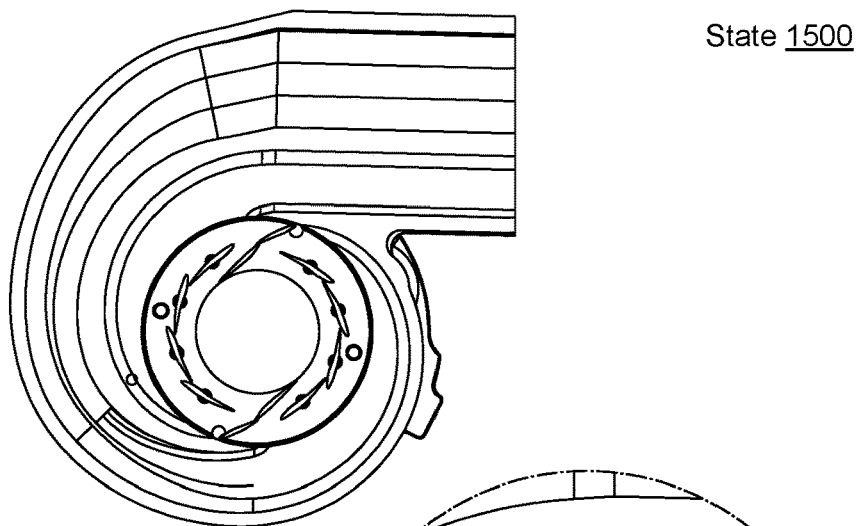
FIGS. 15A, 15B and 15C are views of portions of an example of an assembly that includes vanes in a first orientation or state.
Figure 15B:
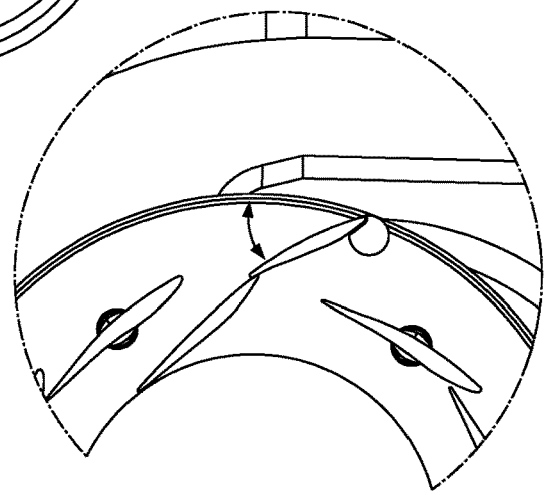
Figure 15C:
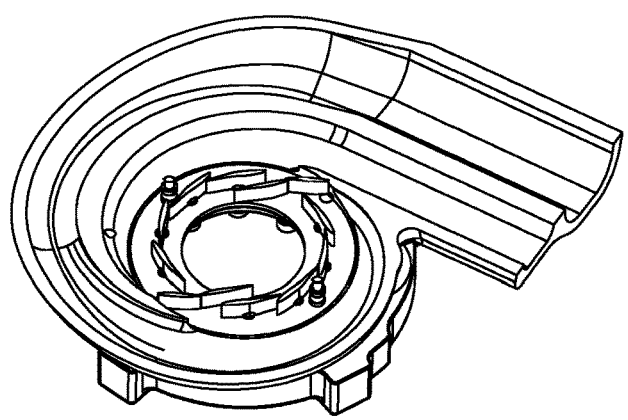

FIGS. 15A, 15B and 15C show portions of the assembly 1460 where vanes are in a first orientation or state 1500.

Figure 16A:
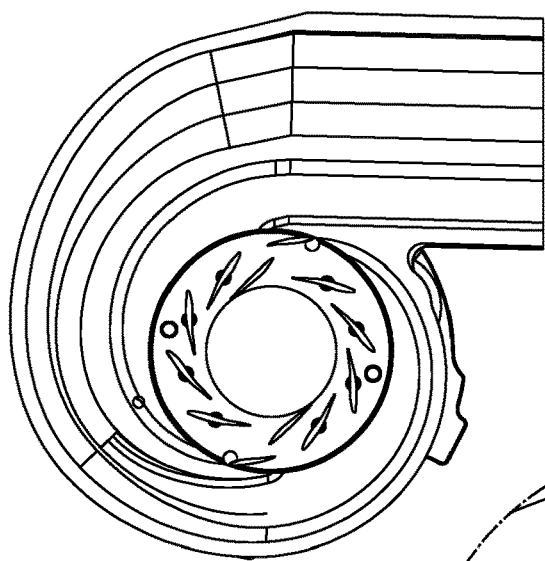
FIGS. 16A, 16B and 16C are views of portions of an example of an assembly that includes vanes in a first orientation or state.
Figure 16B:
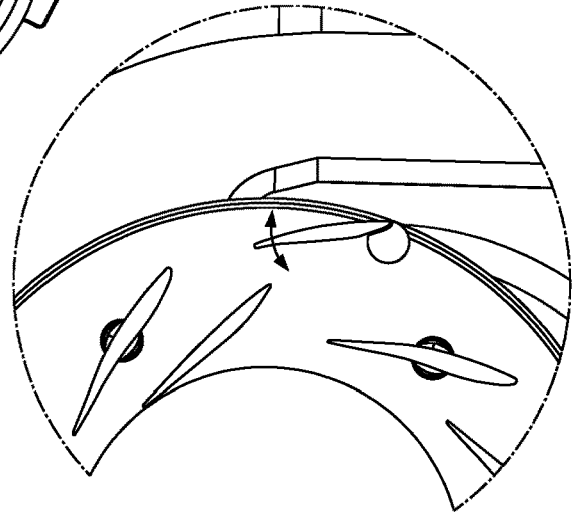
Figure 16C:
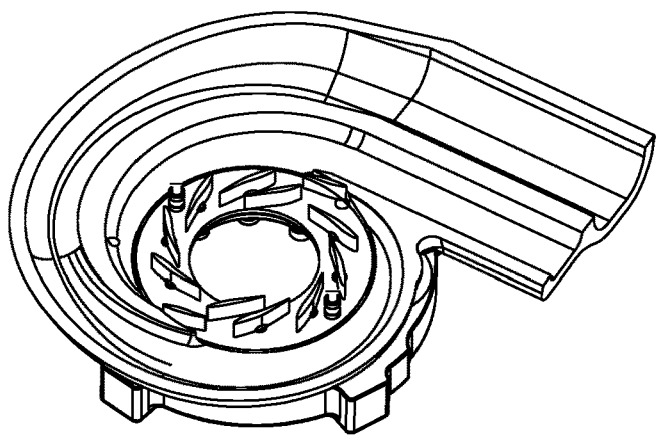

FIGS. 16A, 16B and 16C show portions of the assembly 1460 where vanes are in a second orientation or state 1600.

Figure 17A:
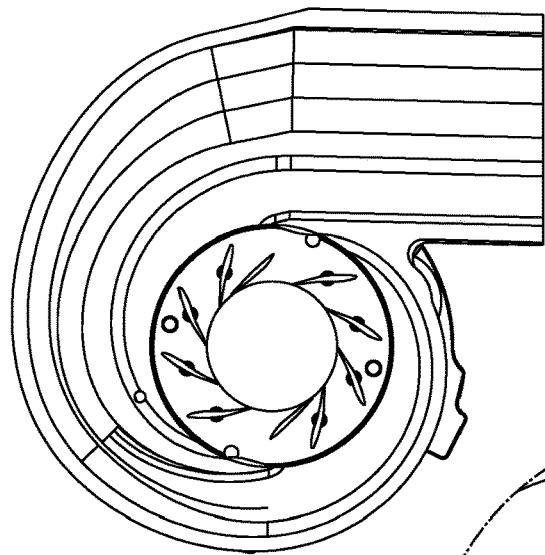
FIGS. 17A, 17B and 17C are views of portions of an example of an assembly that includes vanes in a first orientation or state.
Figure 17B:
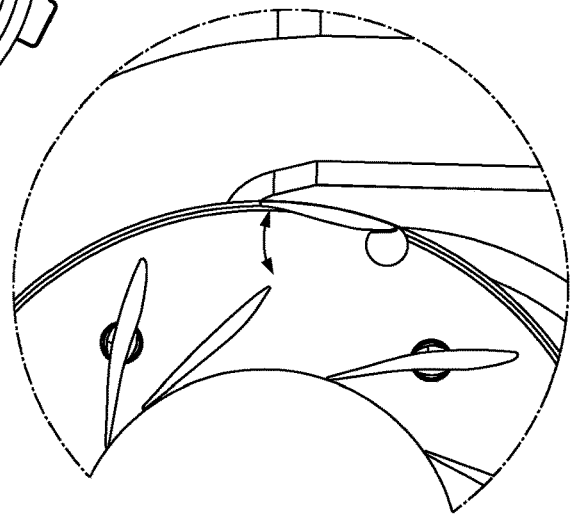
Figure 17C:
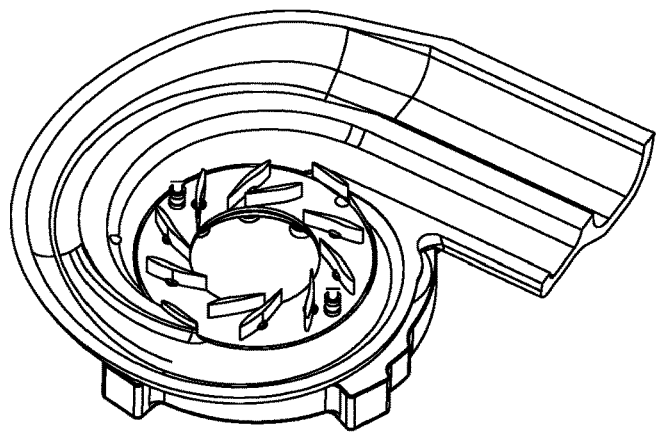

FIGS. 17A, 17B and 17C show portions of the assembly 1460 where vanes are in a third orientation or state 1700. As shown in FIGS. 15B, 16B and 17B, a divider vane can move between various positions. FIG. 16B shows a position intermediate to those of FIG. 15B and FIG. 17B.

Figure 18A:
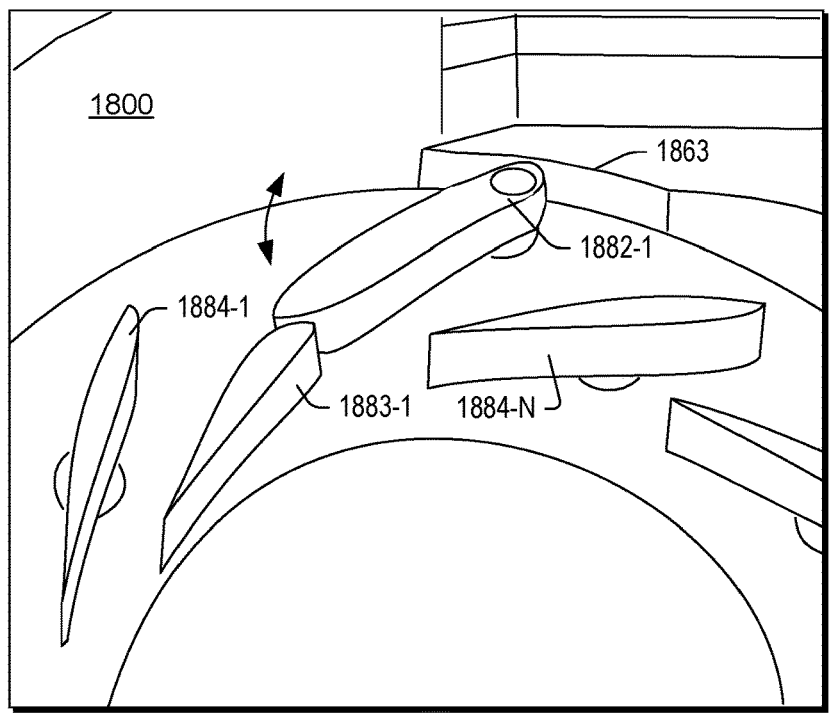
FIGS. 18A and 18B are perspective views of a portion of an example of an assembly that includes a variable geometry mechanism in a first orientation or state and in a second orientation or state.
Figure 18B:
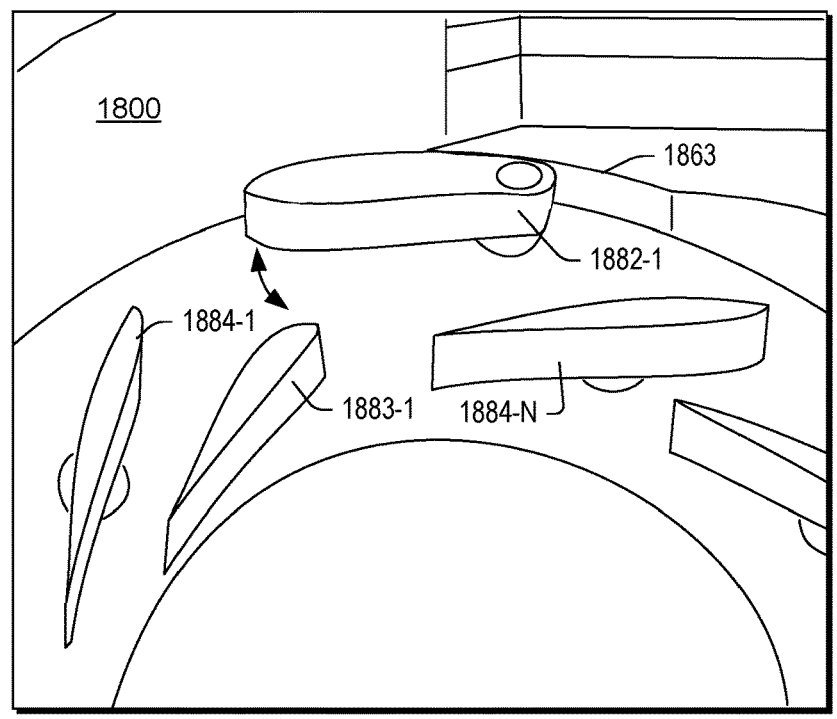

FIGS. 18A and 18B show a portion of an example of an assembly 1800 that includes a variable geometry mechanism. In the example of FIGS. 18A and 18B, a vane 1882-1 is disposed proximate to a wall end 1863 (e.g., a wall end surface). As indicated by a double headed arrow, the vane 1882-1 may be pivoted toward or away from the wall end 1863. As an example, the vane 1882-1 may act as a "movable wall end". For example, the vane 1882-1 may shape the wall end in a manner to direct exhaust gas. Also shown in FIGS. 18A and 18B are vanes 1884-1 to 1884-N, which may be adjustable to shape throats for control of flow of exhaust gas to a turbine wheel space. Further, in the example of FIGS. 18A and 18B, a structure 1883-1 is shown, which may be fixed or optionally movable. As shown in FIG. 18A, a portion of the vane 1882-1 may be moved such that it is adjacent to the structure 1883-1. In such an example, the vane 1882-1 may form relatively continuous surfaces with the structure 1883-1. As an example, the assembly 1800 may include another vane (e.g., 1882-2) and another structure (e.g., 1883-2).

Figure 19:
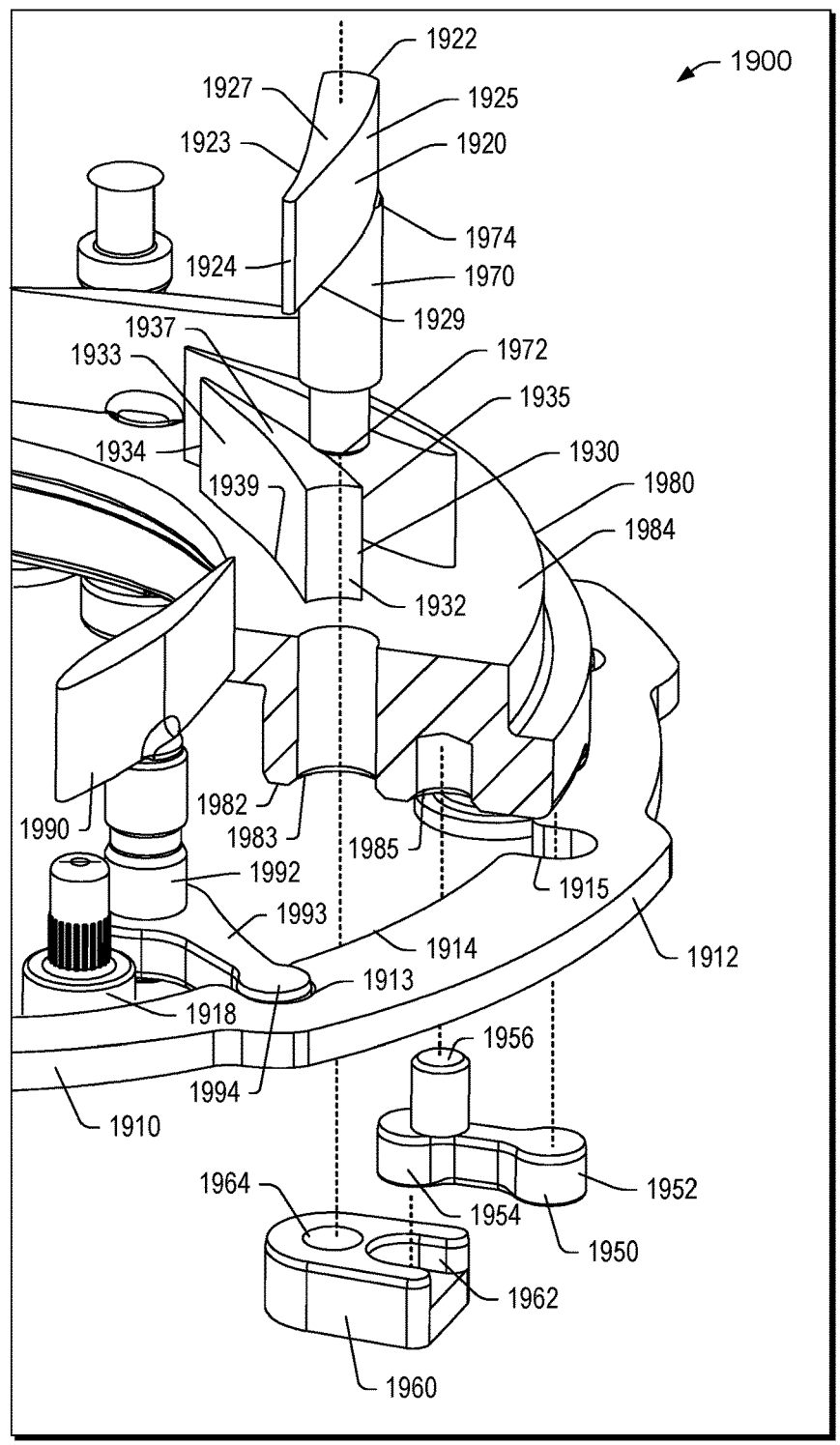
FIG. 19 is a perspective view of a portion of an example of an assembly.

FIG. 19 shows a cutaway view of a portion of an example of an assembly 1900 (see, e.g., the variable geometry mechanism 880 of FIGS. 8, 9, 10A, 10B, and 10C). In the example of FIG. 19, the assembly 1900 includes a ring 1910, which may be a rotatable ring (e.g., a rotatable unison ring). As shown, the ring 1910 includes an outer perimeter 1912 and an inner perimeter 1914 where sockets 1913 and 1915 are formed in the inner perimeter 1914, for example, the inner perimeter 1914 can be disposed at a radius about a central axis (e.g., a rotational axis such as the z-axis of FIG. 9) of the ring 1910 where the sockets 1913 and 1915 extend at least in part radially outwardly from the radius of the inner perimeter 1914. In the example of FIG. 19, a roller 1918 is disposed at a position such that a surface of the roller 1918 contacts the inner perimeter 1914 of the ring 1910. In such an example, as the ring 1910 rotates about its central axis (see, e.g., the z-axis of FIG. 9), the roller 1918 can guide the ring 1910 and spin about a roller axis, which can help to reduce friction.

As shown in the example of FIG. 19, the socket 1915 of the ring 1910 can operatively couple with a first control link 1950. As shown, the first control link 1950 includes a lobe end 1952, a lobe end 1954 and a post 1956 where the lobe end 1952 can be received by the socket 1915 of the ring 1910. As shown, an annular base 1980 can include a lower surface 1982, an upper surface 1984, a through bore 1983 and a bore 1985. The bore 1985 can receive at least a portion of the post 1956 of the first control link 1950. In such an arrangement, rotation of the ring 1910 causes the first control link 1950 to pivot about an axis of the post 1956, for example, as aligned with an axis of the bore 1985. In the example of FIG. 19, a second control link 1960 includes a socket 1962 and a bore 1964 where the lobe end 1954 of the first control link 1950 can be received in the socket 1962 of the second control link 1960. In such an arrangement, pivoting of the first control link 1950 causes pivoting of the second control link 1960.

In the example of FIG. 19, the assembly 1900 includes a vane 1990 and a vane 1920, which includes a post 1970 that includes a post end 1972 and a vane end 1974. As shown, the post end 1972 of the vane 1920 may be inserted into the through bore 1983 of the annular base 1980 such that the post 1970 may be operatively coupled to the second control link 1960. For example, the post end 1972 may be received by the bore 1964 of the second control link 1960. The post 1970 may be fixed to the second control link 1960, for example, via welding, crimping, bolting, etc. In such an example, rotation of the ring 1910 causes pivoting of the first control link 1950, which causes pivoting of the second control link 1960 and rotation of the post 1970 about a post axis. As the post 1970 is operatively coupled to (e.g., optionally integral to) the vane 1920 (e.g., at the vane end 1974), the vane 1920 can be moved to a desired orientation via rotation of the ring 1910.

In the example of FIG. 19, the vane 1990 includes a post 1992 that is operatively coupled to a third control link 1993 which includes a lobe end 1994 that is received by the socket 1913 of the ring 1910. As the post 1992 can be received in a through bore of the annular base 1980, rotation of the ring 1910 can cause the post 1992 to pivot about a post axis and thereby adjust the vane 1990. As an example, the assembly 1900 can include a plurality of vanes such as the vane 1990 and, for example, one or more additional vanes such as, for example, the vane 1920.

As an example, a ring may act to control the orientation of two different types of vanes. In such an example, an amount of pivoting of the different types of vanes may be determined by characteristics of one or more control linkages that are operatively coupled to a component such as a ring. In such an example, rotation of the ring may cause one type of vane to pivot a first amount (e.g., angle) and another type of vane to pivot a second amount (e.g., angle). As an example, the different types of vanes may provide one or more different functions. For example, the vane 1920 can provide at least one function that differs from the vane 1990.

In the example of FIG. 19, the vane 1920 includes opposing ends 1922 and 1924, opposing sides 1923 and 1925 and opposing faces 1927 and 1929. The example of FIG. 19 also includes a structure 1930, which is shown as including opposing ends 1932 and 1934, opposing sides 1933 and 1935 and opposing faces 1937 and 1939. As an example, the end 1932 of the structure 1930 may be concave while the end 1922 of the vane 1920 may be convex. As an alternative example, an end of a structure may be convex while an end of a vane may be concave. As an example, an end of a vane and an end of a structure may be shaped such that the vane can pivot with respect to the structure while forming a relatively continuous surface or surfaces between the vane and the structure. For example, the surfaces 1923 and 1933 and the surfaces 1925 and 1935 may be relatively continuous surfaces in various orientations of the vane 1920, as adjusted via rotation of the ring 1910. In such an example, a small clearance may exist between the end 1922 of the vane 1920 and the end 1932 of the structure 1930 (e.g., which may have a vane-like shape) that allows for movement of the vane 1920 without a substantial amount of flow for flow of exhaust through the clearance. In such an example, leakage of exhaust through the clearance may be minimal.

As an example, the annular base 1980 can be a nozzle ring where the surface 1984 forms part of an exhaust passage (e.g., a nozzle) with another surface that is spaced axially therefrom (see, e.g., the assembly 1050 of FIG. 10A). For example, a cartridge can include an insert (see, e.g., the insert 1060 of FIG. 10A) that includes a substantially annular planar surface that in combination with the surface 1984 forms a nozzle. Such a nozzle can have a nozzle height that is slightly greater than a vane height of a vane (e.g., of the vane 1920 and of the vane 1990). As an example, vanes may define throats in a nozzle such that exhaust gas flows from one or more volutes through the throats and to an inducer portion of an exhaust turbine wheel.

As an example, a space between two adjacent vanes may be referred to a throat where, for example, the shape of the throat may be adjustable via pivoting of one or both of the two adjacent vanes. Shapes of throats may direct exhaust gas, for example, in a more tangential or a more axial manner with respect to an axis of rotation of a turbine wheel disposed in a turbine wheel space.

While a ring with sockets and control links with lobes is shown in the example of FIG. 19, vanes may be controllable via one or more other types of mechanisms. For example, a mechanism or mechanisms may include multiple rings, a ring mechanism and another type of mechanism, etc. As an example, the vane 1990 may be adjustable independently of the vane 1920 or the vanes may be adjustable in a coordinate manner (e.g., via rotation of a ring mechanism, etc.). As an example, an amount of pivoting (e.g., angular swing, etc.) may be determined via one or more control links. For example, the control links 1950 and 1960 can be shaped to provide a relationship between rotation of the ring 1910 and pivoting of the vane 1920 and the control link 1993 can be shaped to provide a relationship between rotation of the ring 1910 and pivoting of the vane 1990.

As an example, a vane may be defined by various surfaces. For example, a vane may be defined by airfoil surfaces that meet at a trailing edge and a leading edge and at a base surface and at a hub surface. The airfoil surfaces can include a pressure surface and a suction surface, which may be defined with respect to shape, fluid velocity, etc. As an example, a vane may be a pivotable vane. For example, a vane may be pivotable about a post (e.g., a vane post). As an example, a post may be a post that extends to one side of a vane, to opposing sides of a vane, etc. As an example, a vane may include a base post and a hub post. As an example a vane may include a post disposed at a location between a trailing edge and a leading edge of the vane. As an example, a post may be disposed near or at an end of a vane (see, e.g., the vanes 882-1 and 882-2 of FIG. 8, the vanes 1482-1 and 1482-2 of FIG. 14, etc.).

As an example, a vane may be defined in part by a camberline. A camberline of a vane may be a centerline of the vane. A camberline may be a line that runs through midpoints between a vane's inner and outer airfoil surfaces (e.g., suction and pressure surfaces) between a vane's leading and trailing edges. A camberline may be represented by a plot of midpoints between the vane inner and outer airfoil surfaces (e.g., at set intervals running along the length of the vane defined between the leading and trailing vane edges). As an example, a camberline may be represented by a plot of centers of multiple circles where the circles are drawn "inside" the vane such that they are tangent to the inner and outer airfoil surfaces. As an example, a vane may be solid, hollow, or include solid and hollow portions.

As an example, an assembly can include one or more divider vanes and, for example, variable geometry nozzle vanes. In the example assembly 460 of FIG. 4, the vanes 482-1 and 482-2 can operate as divider vanes while the vanes 484-1 to 484-N can operate as variable geometry nozzle vanes. In the example assembly 860 of FIG. 8, the vanes 882-1 and 882-2 can operate as divider vanes while the vanes 884-1 to 884-N can operate as variable geometry nozzle vanes. In the example assembly 1460 of FIG. 14, the vanes 1482-1 and 1482-2 can operate as divider vanes while the vanes 1484-1 to 1484-N can operate as variable geometry nozzle vanes.

As an example, an assembly may include one or more actuation mechanisms, one or more actuators, etc. As an example, divider vanes and variable geometry nozzle vanes may be adjustable via an actuator or via actuators. As an example, divider vanes and variable geometry nozzle vanes may be independently adjustable. As an example, where an assembly includes multiple divider vanes, each of the vanes may be independently adjustable. As an example, an actuator may adjust a pair of divider vanes where each of the vanes pivots by an angle where the angle may be the same or different (e.g., depending on mechanism, control link(s), etc.). As an example, a pair of divider vanes may be of a common shape or, for example, the divider vanes may differ in shape (e.g., due to path geometry, path flow, etc.).

As an example, a mechanism that control divider vanes may be embedded in a housing tongue area. As an example, a variable geometry nozzle may be adapted, for example, via providing one or more divider vanes and optionally one or more corresponding structures. In such an example, a divider vane may be longer than variable geometry nozzle vanes. For example, a divider vane may be shaped and include a length that can match a tongue.

As an example, an assembly can include an exhaust gas turbine housing that includes an inner wall and an outer wall that define a first exhaust gas channel and a second exhaust gas channel to a turbine wheel space where the inner wall includes an inner wall end at the turbine wheel space and the outer wall includes an outer wall end at the turbine wheel space; a first adjustable divider vane disposed adjacent to the inner wall end; a second adjustable divider vane disposed adjacent to the outer wall end; and at least one set of adjustable variable geometry nozzle vanes that define nozzle throats that direct flow of exhaust gas from one of the exhaust gas channels to the turbine wheel space. In such an example, the at least one set can include a first set and a second set of adjustable variable geometry nozzle vanes where the first set defines nozzle throats that direct flow of exhaust gas from the first exhaust gas channels to the turbine wheel space and the second set defines nozzle throats that direct flow of exhaust gas from the second exhaust gas channels to the turbine wheel space.

As an example, in an assembly, adjustable divider vanes may be adjustably independent of at least one set of adjustable variable geometry nozzle vanes.

As an example, a first adjustable divider vane may include a post where rotation of the post pivots the first adjustable divider vane and a second adjustable divider vane may include a post where rotation of the post pivots the second adjustable divider vane.

As an example, an assembly may include an adjustment mechanism that adjusts adjustable divider vanes and adjustable variable geometry nozzle vanes. As an example, an assembly may include a first adjustment mechanism that adjusts adjustable divider vanes and a second adjustment mechanism that adjusts adjustable variable geometry nozzle vanes. As an example, an assembly may include an adjustment mechanism that adjusts a first set of vanes and another adjustment mechanism that adjusts a second set of vanes. As an example, an assembly may include a plurality of adjustment mechanisms.

As an example, an assembly can include at least one actuator that actuates at least one adjustment mechanism. In such an example, an engine control unit may be operatively coupled to the at least one actuator.

As an example, an assembly can include a turbine wheel disposed at least in part in a turbine wheel space defined by an exhaust gas turbine housing.

As an example, a method can include, in an assembly that includes an exhaust gas turbine housing that includes an inner wall and an outer wall that define a first exhaust gas channel and a second exhaust gas channel to a turbine wheel space where the inner wall includes an inner wall end at the turbine wheel space and the outer wall includes an outer wall end at the turbine wheel space, a first adjustable divider vane disposed adjacent to the inner wall end, a second adjustable divider vane disposed adjacent to the outer wall end, and at least one set of adjustable variable geometry nozzle vanes that define nozzle throats that direct flow of exhaust gas from one of the exhaust gas channels to the turbine wheel space, flowing exhaust gas in the first exhaust gas channel and the second exhaust gas channel; and adjusting the first adjustable divider vane and the second adjustable divider vane. Such a method may include adjusting the at least one set of adjustable variable geometry nozzle vanes. As an example, the at least one set of adjustable variable geometry nozzle vanes can include a first set and a second set of adjustable variable geometry nozzle vanes where the first set defines nozzle throats that direct flow of exhaust gas from the first exhaust gas channels to the turbine wheel space and the second set defines nozzle throats that direct flow of exhaust gas from the second exhaust gas channels to the turbine wheel space.

As an example, a method can include adjusting a first set of adjustable variable geometry nozzle vanes and a second set of adjustable variable geometry nozzle vanes optionally, for example, adjusting the first set and the second set independently of each other. As an example, a method can include adjusting a first set and a second set of adjustable variable geometry nozzle vanes independent of adjusting a first divider vane and a second divider vane.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. An assembly comprising:
    an exhaust gas turbine housing that comprises an inner wall and an outer wall that define a first exhaust gas channel and a second exhaust gas channel to a turbine wheel space wherein the inner wall comprises an inner wall end at the turbine wheel space and the outer wall comprises an outer wall end at the turbine wheel space;
    a first adjustable divider vane disposed adjacent to the inner wall end;
    a second adjustable divider vane disposed adjacent to the outer wall end;
    at least one set of adjustable variable geometry nozzle vanes that define nozzle throats that direct flow of exhaust gas from one of the exhaust gas channels to the turbine wheel space; and
    an adjustment mechanism that adjusts the adjustable divider vanes and the adjustable variable geometry nozzle vanes wherein the adjustment mechanism comprises a ring operatively coupled to the adjustable divider vanes and the adjustable variable geometry nozzle vanes.

2. The assembly of claim 1 comprising a first set and a second set of adjustable variable geometry nozzle vanes wherein the first set defines nozzle throats that direct flow of exhaust gas from the first exhaust gas channels to the turbine wheel space and the second set defines nozzle throats that direct flow of exhaust gas from the second exhaust gas channels to the turbine wheel space.

3. The assembly of claim 1 wherein the first adjustable divider vane comprises a post wherein rotation of the post pivots the first adjustable divider vane and wherein the second adjustable divider vane comprises a post wherein rotation of the post pivots the second adjustable divider vane.

4. The assembly of claim 1 further comprising at least one actuator that actuates the adjustment mechanism.

5. The assembly of claim 4 further comprising an engine control unit operatively coupled to the at least one actuator.

6. The assembly of claim 1 further comprising a turbine wheel disposed at least in part in the turbine wheel space.

7. The assembly of claim 1 comprising control links that are operatively coupled to the ring wherein each control link is operatively coupled to a respective one of the adjustable divider vanes or the adjustable variable geometry nozzle vanes.

8. The assembly of claim 7 wherein the control links comprise adjustable divider vane control links and adjustable variable geometry nozzle vane control links, wherein the adjustable divider vane control links differ in shape from the adjustable variable geometry nozzle vane control links.

9. The assembly of claim 7 wherein each of the adjustable divider vanes comprises a plurality of control links.

10. The assembly of claim 9 wherein each of the adjustable divider vanes comprises a plurality of control links that are linked in series.

11. The assembly of claim 1 wherein, for each of the adjustable divider vanes, a socket of the ring accepts a lobe end of a first control link that operatively couples to a second control link that operatively couples to a post of a respective one of the adjustable divider vanes.

12. The assembly of claim 11 wherein, for each of the adjustable variable geometry nozzle vanes, a socket of the ring accepts a lobe end of a control link that operatively couples to a post of a respective one of the adjustable variable geometry nozzle vanes.

13. A method comprising:
    in an assembly that comprises an exhaust gas turbine housing that comprises an inner wall and an outer wall that define a first exhaust gas channel and a second exhaust gas channel to a turbine wheel space wherein the inner wall comprises an inner wall end at the turbine wheel space and the outer wall comprises an outer wall end at the turbine wheel space, a first adjustable divider vane disposed adjacent to the inner wall end, a second adjustable divider vane disposed adjacent to the outer wall end, at least one set of adjustable variable geometry nozzle vanes that define nozzle throats that direct flow of exhaust gas from one of the exhaust gas channels to the turbine wheel space, and an adjustment mechanism that adjusts the first and second adjustable divider vanes and the at least one set of adjustable variable geometry nozzle vanes wherein the adjustment mechanism comprises a ring operatively coupled to the first and second adjustable divider vanes and the at least one set of adjustable variable geometry nozzle vanes, flowing exhaust gas in the first exhaust gas channel and the second exhaust gas channel; and
    adjusting the first adjustable divider vane, the second adjustable divider vane and the at least one set of adjustable variable geometry nozzle vanes via the adjustment mechanism.

14. The method of claim 13 wherein the at least one set of adjustable variable geometry nozzle vanes comprises a first set and a second set of adjustable variable geometry nozzle vanes wherein the first set defines nozzle throats that direct flow of exhaust gas from the first exhaust gas channels to the turbine wheel space and the second set defines nozzle throats that direct flow of exhaust gas from the second exhaust gas channels to the turbine wheel space.

15. The method of claim 14 comprising adjusting the first set of adjustable variable geometry nozzle vanes and the second set of adjustable variable geometry nozzle vanes.

* * * * *